(12) United States Patent
GadelRab et al.

(10) Patent No.: US 10,019,380 B2
(45) Date of Patent: Jul. 10, 2018

(54) PROVIDING MEMORY MANAGEMENT FUNCTIONALITY USING AGGREGATED MEMORY MANAGEMENT UNITS (MMUS)

(71) Applicant: QUALCOMM Incorporated, San Diego, CA (US)

(72) Inventors: Serag Monier GadelRab, Markham (CA); Jason Edward Podaima, Markham (CA); Ruolong Liu, Markham (CA); Alexander Miretsky, Vaughan (CA); Paul Christopher John Wiercienski, Toronto (CA); Kyle John Ernewein, Toronto (CA); Carlos Javier Moreira, Markham (CA); Simon Peter William Booth, San Diego, CA (US); Meghal Varia, Brampton (CA); Thomas David Dryburgh, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/866,228

(22) Filed: Sep. 25, 2015

(65) Prior Publication Data

US 2017/0091116 A1 Mar. 30, 2017

(51) Int. Cl.
*G06F 12/00* (2006.01)
*G06F 12/1072* (2016.01)
(Continued)

(52) U.S. Cl.
CPC .. *G06F 12/1072* (2013.01); *G06F 2212/1008* (2013.01); *G06F 2212/1016* (2013.01)

(58) Field of Classification Search
CPC .......................... G06F 12/0145; G06F 2212/65
See application file for complete search history.

(56) References Cited

U.S. PATENT DOCUMENTS 6,625,157 B2 * 9/2003 Niu ..................... H04L 12/2854
370/389
7,917,726 B2 3/2011 Hummel et al.
(Continued)

FOREIGN PATENT DOCUMENTS

WO 2015085247 A1 6/2015

OTHER PUBLICATIONS

International Search Report and Written Opinion for PCT/US2016/051254, dated Nov. 11, 2016, 11 pages.
(Continued)

*Primary Examiner* — Mark A Giardino, Jr.
(74) *Attorney, Agent, or Firm* — W&T/Qualcomm

(57) ABSTRACT

Providing memory management functionality using aggregated memory management units (MMUs), and related apparatuses and methods are disclosed. In one aspect, an aggregated MMU is provided, comprising a plurality of input data paths including each including plurality of input transaction buffers, and a plurality of output paths each including a plurality of output transaction buffers. Some aspects of the aggregated MMU additionally provide one or more translation caches and/or one or more hardware page table walkers The aggregated MMU further includes an MMU management circuit configured to retrieve a memory address translation request (MATR) from an input transaction buffer, perform a memory address translation operation based on the MATR to generate a translated memory address field (TMAF), and provide the TMAF to an output transaction buffer. The aggregated MMU also provides a plurality of output data paths, each configured to output transactions with resulting memory address translations.

44 Claims, 21 Drawing Sheets

(51) Int. Cl.
  *G06F 13/00* (2006.01)
  *G06F 13/28* (2006.01)

(56) References Cited

U.S. PATENT DOCUMENTS

| | | |
|---|---|---|
| 8,234,407 B2 * | 7/2012 | Sugumar ............ G06F 12/1027 709/213 |
| 2010/0332787 A1 | 12/2010 | Grohoski et al. |
| 2012/0117301 A1 | 5/2012 | Wingard |
| 2013/0097401 A1 | 4/2013 | Sarta |
| 2013/0227245 A1 | 8/2013 | Gupta et al. |
| 2014/0040562 A1 | 2/2014 | Koka et al. |
| 2014/0089635 A1 | 3/2014 | Shifer et al. |

OTHER PUBLICATIONS

International Preliminary Report on Patentability for PCT/US2016/051254, dated Aug. 23, 2017, 6 pages.

* cited by examiner

US 10,019,380 B2

PROVIDING MEMORY MANAGEMENT FUNCTIONALITY USING AGGREGATED MEMORY MANAGEMENT UNITS (MMUS)

BACKGROUND

I. Field of the Disclosure

The technology of the disclosure relates generally to memory management units (MMUs) of computer processing systems.

II. Background

Memory management units, or MMUs, are elements of modern computer processing systems that provide memory management functionality to computer processors and/or peripheral devices. Such memory management functionality may include virtual-to-physical memory address translation and caching, as well as memory protection and attribute control. As the number of processing cores in modern computer processors has increased, the amount of processor chip area that is dedicated to providing MMU functionality to those processing cores has likewise increased.

The MMU architectures presently known in the art have proven ineffective in reducing the chip area cost of providing MMU functionality while maintaining MMU performance. One such architecture is referred to herein as a "monolithic MMU" architecture. A computer processing system employing a monolithic MMU architecture provides multiple monolithic MMUs, each of which includes one input data path and one output data path. Each monolithic MMU also provides its own translation cache and transaction buffer and scheduler, and one or more dedicated hardware page table walkers. Because each of the monolithic MMUs operates independently of the other monolithic MMUs, high processing performance may be achieved by providing one MMU for each high-performance traffic-producing client. However, the monolithic MMUs may consume a relatively large chip area due to the duplication of their constituent elements, and sharing of a monolithic MMU among low-performing clients may result in performance degradation.

Another MMU architecture is referred to herein as the "distributed MMU" architecture. In a computer processing system employing a distributed MMU architecture, each traffic-producing client may be associated with a corresponding client MMU unit. Each client MMU unit provides a local transaction buffer and scheduler and a local translation cache for its associated traffic-producing client. The client MMU units are communicatively coupled to a central MMU unit, which provides a central translation cache and one or more hardware page table walkers. Because the hardware page table walker(s) of the central MMU unit are shared between the client MMU units, the distributed MMU architecture may provide chip area savings relative to monolithic MMUs for lower-performance processors. However, the distributed MMU architecture does not scale well to mid- and high-performance processors. This is due in part to replication of translation cache entries in the client MMU units and the central MMU unit, as well as the chip area required for interconnects between each client MMU unit and the central MMU unit. The central MMU unit may also require a dedicated port to a memory controller interconnect, which may further increase chip area used.

SUMMARY OF THE DISCLOSURE

Aspects disclosed in the detailed description include providing memory management functionality using aggregated memory management units (MMUs). Related apparatuses and methods are also disclosed. In this regard, in one aspect, an aggregated MMU is provided. The aggregated MMU comprises a plurality of input data ports, each providing access to a corresponding input data path, and a plurality of output data paths each driving an output data port. Each of the plurality of input data paths includes its own dedicated input transaction buffer. Similarly, each of the plurality of output data paths includes its own dedicated output transaction buffer. In some aspects, the number of input data paths may be equal to, larger than, or smaller than the number of output data paths. In some aspects, the number of input data ports may be equal to, larger than, or smaller than the number of output data ports. The aggregated MMU also includes an MMU management circuit that is configured to retrieve a memory address translation request (MATR) for pre-translation transactions residing in an input transaction buffer. The MMU management circuit performs a memory address translation operation based on the MATR to generate a translated memory address field (TMAF), and provides the TMAF to an output transaction buffer to be output as part of a post-translation transaction via an output data path to an output data port. In this manner, multiple traffic-producing clients that are connected to the various input data paths may be efficiently serviced by the aggregated MMU, while preventing any single client from monopolizing MMU resources.

Some aspects of the MMU management circuit comprise one or more translation caches. According to some aspects, each of the one or more translation caches may be shared among all input data paths and/or may be partitioned into multiple smaller caches that each can be shared among a subset of input data paths and/or dedicated to one or more input data path. Some aspects of the aggregated MMU additionally provide one or more hardware page table walkers. In some aspects, the one or more hardware page table walkers may be shared among all input data paths, may be divided into groups that are each reserved for specific input data path or input data paths, and/or may be divided into groups that are reserved for transactions with specific priorities as defined by a Quality of Service (QoS) scheme. Some aspects may provide that the input data paths, the output data paths, the one or more translation caches, and the one or more hardware page table walkers are interconnected to enable sharing of control and management circuitry.

In some aspects, the MMU management circuit is configured to apply internal Quality-of-Service (QoS) arbitration at multiple processing points to govern access to internally shared resources. As a non-limiting example, the MMU management circuit in some aspects disclosed herein comprises an input translation scheduler that may receive the MATR of a pre-translation transaction residing in the input transaction buffers according to an input transaction QoS arbitration, and place the MATR of the pre-translation transaction in a pending transaction address buffer (PTAB). According to some aspects, the PTAB may be shared among all input data paths, may be divided into groups of entries that are each reserved to a specific input data path or a group of input data paths, and/or may be divided into groups of entries that are each reserved for transactions with specific priorities as defined by a QoS scheme.

According to some aspects, the MMU management circuit may also include an MMU manager that monitors the addition of MATRs for pre-translation transactions into the PTAB, and may select MATRs for processing according to a QoS arbitration between one or more pending MATRs. The MMU manager may determine whether a cached memory address translation result exists for the MATR in the one or more translation caches, and, if so, may provide the cached memory address translation result to the PTAB. If not, the MMU manager may assign the translation of the MATR to one of the one or more hardware page table walkers. Some aspects of the MMU management circuit may further provide an output translation scheduler that retrieves a completed TMAF from the PTAB, and queues the TMAF to a corresponding output transaction buffer according to a QoS arbitration policy for output transactions. By providing a mix of dedicated and shared elements such as those discussed above, the aggregated MMU may provide improved performance while reducing area cost relative to both monolithic MMUs and distributed MMUs.

In another aspect, an aggregated MMU is provided. The aggregated MMU comprises a plurality of input data ports, each of which is configured to convey pre-translation transactions to a plurality of input data paths configured to receive a plurality of memory address pre-translation read transactions and a plurality of pre-translation write transactions. The plurality of input data paths comprise a corresponding plurality of input transaction buffers, each comprising a plurality of input transaction buffer slots configured to store a respective pre-translation transactions among the plurality of pre-translation transactions. The aggregated MMU further comprises a plurality of output data paths that comprise a corresponding plurality of output transaction buffers. Each of the plurality of output transaction buffers comprises a plurality of output transaction buffer slots configured to store a respective post-translation transaction of a plurality of post-translation transactions. The aggregated MMU also comprises an MMU management circuit. The MMU management circuit is configured to retrieve a MATR of a pre-translation transaction from an input transaction buffer of the plurality of input transaction buffers. The MMU management circuit is further configured to perform a memory address translation operation based on the MATR to generate a TMAF. The MMU management circuit is also configured to provide the TMAF and a pre-translation transaction payload as a post-translation transaction to an output transaction buffer of the plurality of output transaction buffers. Each output data path of the plurality of output data paths of the aggregated MMU is configured to output the post-translation transaction through a corresponding plurality of output data ports.

In another aspect, an aggregated MMU is provided. The aggregated MMU comprises a means for retrieving a MATR from an input transaction buffer of a plurality of input transaction buffers corresponding to a plurality of input data paths. The aggregated MMU further comprises a means for performing a memory address translation operation based on the MATR to generate a TMAF. The aggregated MMU also comprises a means for providing the TMAF and a pre-translation transaction payload as a post-translation transaction to an output transaction buffer of a plurality of output transaction buffers corresponding to the plurality of input data paths. The aggregated MMU additionally comprises a means for outputting the post-translated transaction via an output data path of a plurality of output data paths to an output data port of a plurality of output data ports.

In another aspect, a method for providing memory management is provided. The method comprises retrieving, by an aggregated memory management unit (MMU), a MATR from an input transaction buffer of a plurality of input transaction buffers corresponding to a plurality of input data paths. The method further comprises performing a memory address translation operation based on the MATR to generate a TMAF. The method also comprises providing the TMAF and a pre-translation transaction payload as a post-translation transaction to an output transaction buffer of a plurality of output transaction buffers corresponding to the plurality of input data paths. The method additionally comprises outputting the post-translated transaction via an output data path of a plurality of output data paths to an output data port of a plurality of output data ports.

DETAILED DESCRIPTION

Figure 1A:
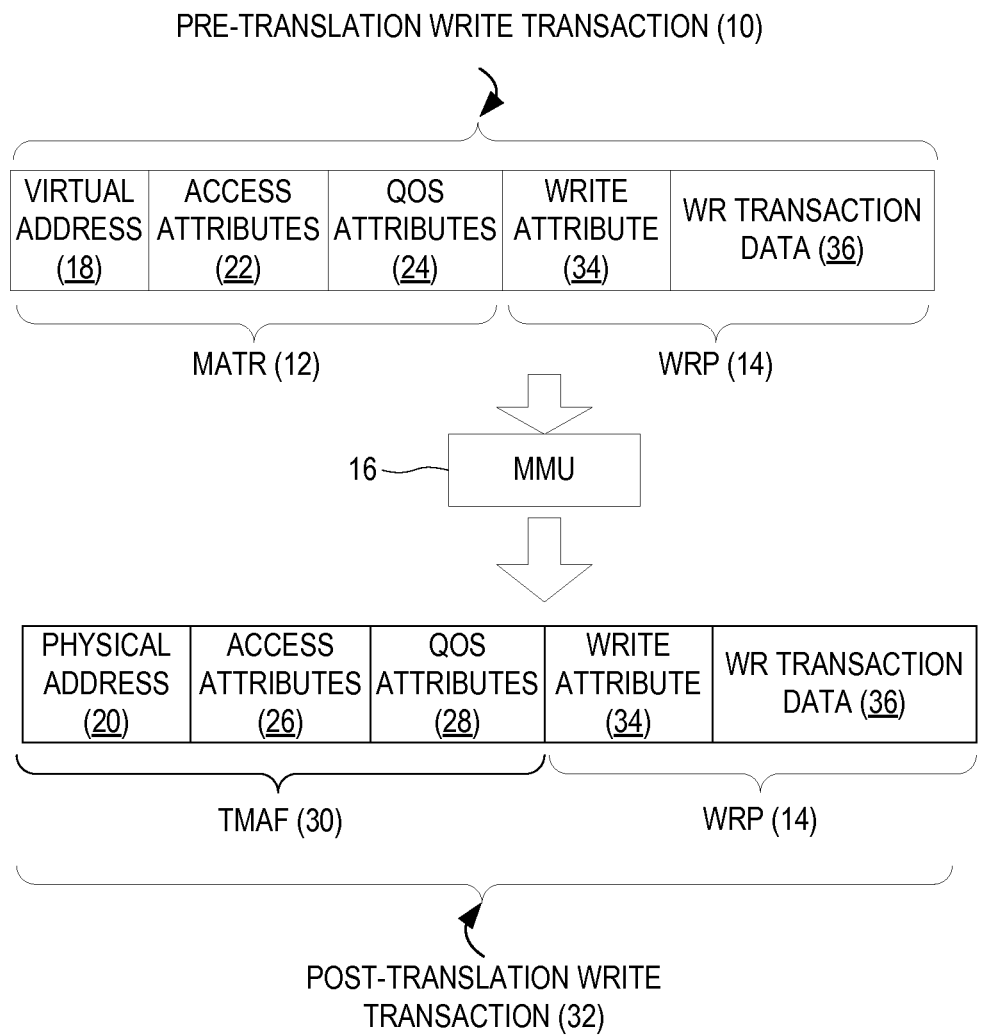
FIGS. 1A and 1B are a diagrams showing exemplary constituent fields of pre-translation transactions (i.e., read and/or write transactions), and how each may be modified by the operation of a memory management unit (MMU)
Figure 1B:
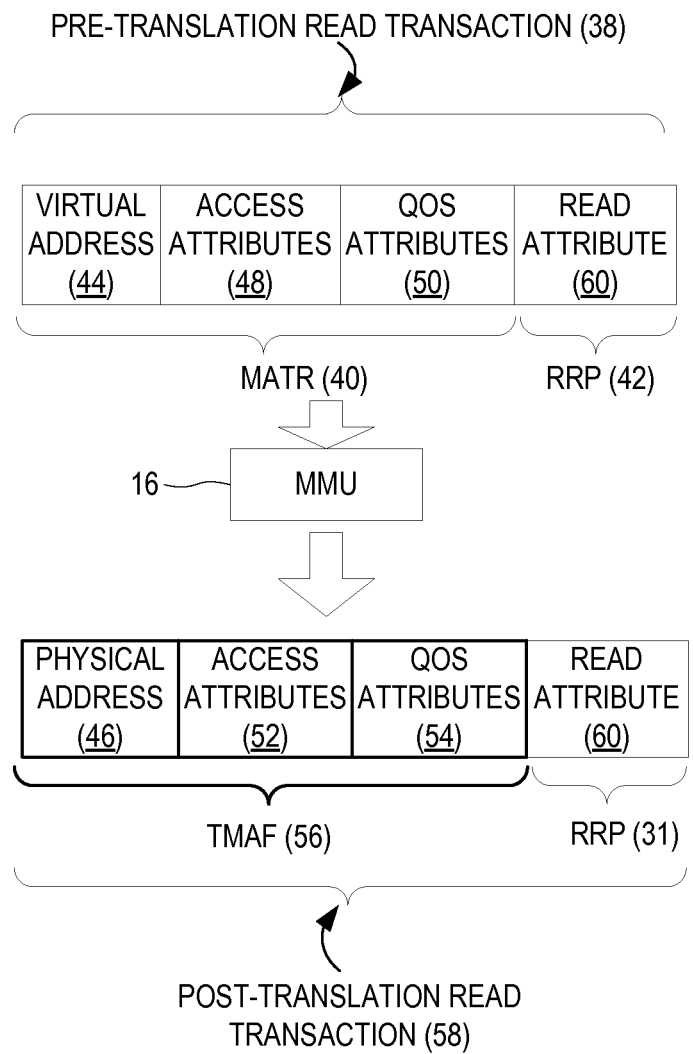

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects Aspects disclosed in the detailed description include providing memory management functionality using aggregated memory management units (MMUs). Before describing the monolithic MMU and distributed MMU architectures and the elements and operations of exemplary aggregated MMUs in greater detail, exemplary constituent fields of pre-translation transactions (i.e., read and/or write transactions) and how each may modified by the operation of an MMU are discussed. In this regard, FIGS. 1A and 1B are provided. FIG. 1A illustrates an exemplary pre-translation write transaction, while FIG. 1B illustrates an exemplary read transaction.

Referring now to FIG. 1A, a pre-translation write transaction 10 originating from a client (not shown) may be composed of two parts: a transaction memory address translation request (MATR) 12 and a write request payload (WRP) 14. An MMU 16 receives the pre-translation write transaction 10 from the client and processes the MATR 12 by modifying its constituent sub-components as required. In particular, a virtual address 18 of the MATR 12 is translated by the MMU 16 to a physical address 20. Access attributes 22 and QoS attributes 24 of the MATR 12 may be modified into access attributes 26 and QoS attributes 28, respectively, of the translated memory access field (TMAF) 30 or may be copied unmodified into access attributes 26 and QoS attributes 28. The MMU 16 outputs a post-translation write transaction 32 by appending the unmodified WRP 14 (comprising write attribute 34 and write (WR) transaction data 36) from the pre-translation write transaction 10 to the TMAF 30.

Similarly, as seen in FIG. 1B, an exemplary pre-translation read transaction 38 is composed of two parts: a MATR 40 and a read request payload (RRP) 42. The MMU 16 receives the pre-translation read transaction 38 from a client (not shown) and processes the MATR 40 by modifying its constituent sub-components as required. A virtual address 44 of the MATR 40 is translated by the MMU 16 to a physical address 46. Access attributes 48 and QoS attributes 50 of the MATR 40 may be modified into access attributes 52 and QoS attributes 54, respectively, of a TMAF 56, or may be copied unmodified into the access attributes 52 and the QoS attributes 54. The MMU 16 outputs a post-translation read transaction 58 by appending the unmodified RRP 42 (comprising a read attribute 60) from the pre-translation read transaction 38 to the TMAF 56.

Figure 2A:
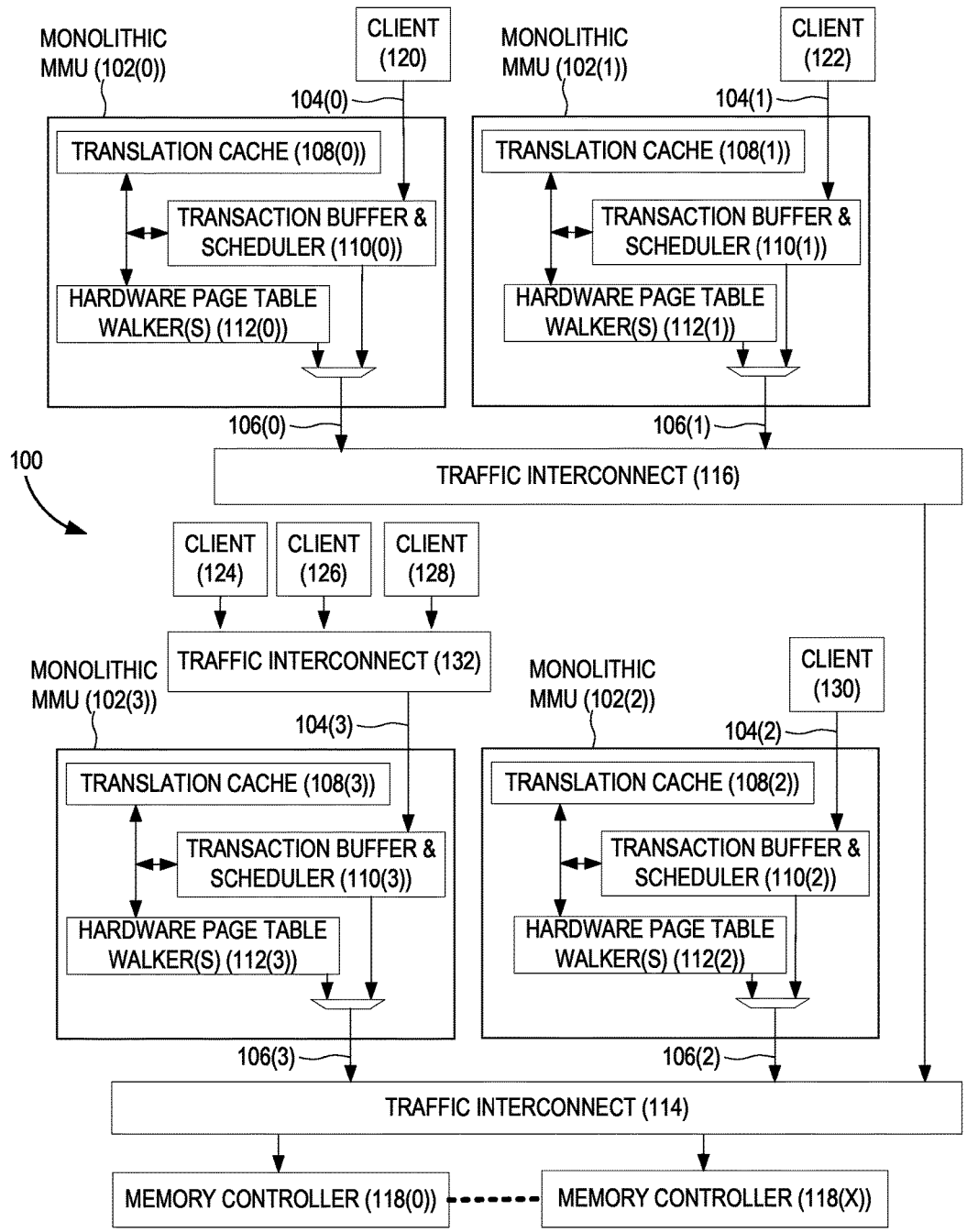
FIG. 2A is a block diagram of an exemplary computer processing system based on a monolithic MMU architecture.

Referring now to FIG. 2A, a computer processing system 100 exemplifying the monolithic MMU architecture provides multiple monolithic MMUs 102(0)-102(3). Each of the monolithic MMUs 102(0)-102(3) includes one input data path 104(0)-104(3) and one output data path 106(0)-106(3), respectively. Each of the monolithic MMUs 102(0)-102(3) also provides a translation cache 108(0)-108(3), a transaction buffer and scheduler 110(0)-110(3), and one or more hardware page table walkers 112(0)-112(3), respectively. As a result, the monolithic MMUs 102(0)-102(3) are capable of operating independently of each other within the computer processing system 100. In the example of FIG. 2A, the output data paths 106(2) and 106(3) of the monolithic MMUs 102(2) and 102(3) are routed directly to a memory controller interconnect 114, while the output data paths 106(0) and 106(1) of the monolithic MMUs 102(0) and 102(1) are multiplexed by an interconnect 116. In this manner, the monolithic MMUs 102(0)-102(3) may provide memory address translation results to a memory controller, such as one of memory controllers 118(0)-118(X), via the memory controller interconnect 114.

Clients 120, 122, 124, 126, 128, and 130 of FIG. 2A represent traffic-producing clients, each of which generates traffic in the form of MATRs (not shown) and other data that are communicated to the monolithic MMUs 102(0)-102(3) via the corresponding input data paths 104(0)-104(3). In the example of FIG. 2A, the clients 120, 122, and 130 represent high-performance traffic-producing clients that may, for instance, generate a high volume of MATRs. Accordingly, the clients 120, 122, and 130 are each serviced exclusively by a single one of the monolithic MMUs 102(0)-102(2), respectively. As a result, the translation caches 108(0)-108(2), the transaction buffers and schedulers 110(0)-110(2), and the hardware page table walkers 112(0)-112(2) of the monolithic MMUs 102(0)-102(2) are effectively dedicated to the corresponding clients 120, 122, and 130. As the clients 120, 122, and 130 do not have to compete for MMU resources with other traffic-producing clients, the monolithic MMUs 102(0)-102(2) are able to provide a high level of performance.

However, because of the potentially large chip area consumed by each of the monolithic MMUs 102(0)-102(3), it may not be feasible to provide a dedicated one of the monolithic MMUs 102(0)-102(3) to every traffic-producing client. Thus, for low-performance traffic-producing clients, such as the clients 124, 126, and 128, the computer processing system 100 may employ an external traffic multiplexor, such as an interconnect 132, to multiplex traffic into a single traffic stream. The interconnect 132 may then direct the traffic stream into the input data path 104(3) of a single monolithic MMU 102(3). In this manner, the monolithic MMU 102(3) may service multiple clients 124, 126, and 128. While this approach may reduce the chip area required to provide memory management functionality, it may introduce additional performance issues that arise due to the sharing of the MMU resources of the monolithic MMU 102(3) among the clients 124, 126, and 128. For example, because the translation cache 108(3) is shared, a "thrashing" condition may occur in which the clients 124, 126, and 128 repeatedly evict each other's entries from the translation cache 108(3). Moreover, because the transaction buffer and scheduler 110(3) is shared, it may be possible for an aggressive client to occupy all slots in the transaction buffer and scheduler 110(3), effectively denying access to traffic from less aggressive clients.

Figure 2B:
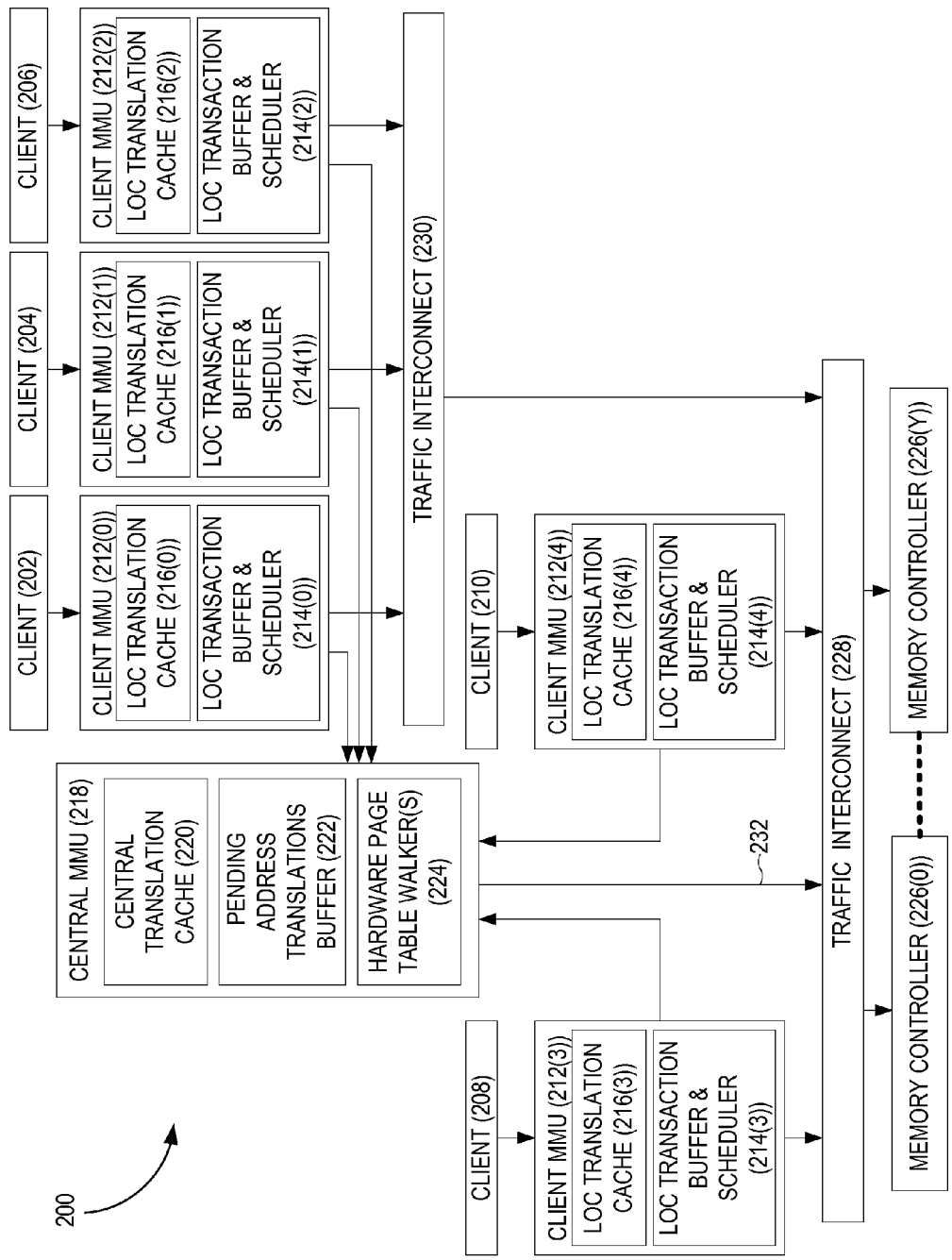
FIG. 2B is a block diagram of an exemplary computer processing system based on a distributed MMU architecture.

The distributed MMU architecture exemplified by a computer processing system 200 of FIG. 2B attempts to address some of the disadvantages inherent in the monolithic MMU architecture of FIG. 2A. In the example of FIG. 2B, the computer processing system 200 includes traffic-producing clients 202, 204, 206, 208, and 210, which are associated with corresponding client MMU units 212(0)-212(4). The client MMU units 212(0)-212(4) provide respective local transaction buffer and schedulers 214(0)-214(4) and local translation caches 216(0)-216(4) for their associated traffic-producing clients 202, 204, 206, 208, 210. The computer processing system 200 further includes a central MMU unit 218, which provides a central translation cache 220, a pending address translations buffer 222, and one or more hardware page table walkers 224. The central translation cache 220 is large relative to the local translation caches 216(0)-216(4), and is shared among the client MMU units 212(0)-212(4) of the traffic-producing clients 202, 204, 206, 208, and 210. Similarly, the functionality provided by the hardware page table walker(s) 224 of the central MMU unit 218 may be shared among the client MMU units 212(0)-212(4) of the traffic-producing clients 202, 204, 206, 208, and 210. As seen in FIG. 2B, access to memory controllers 226(0)-226(Y) may be provided by a direct connection from client MMU units, such as the client MMU units 212(3)-212(4), to a memory controller interconnect 228, or may be provided by an interconnect 230 that aggregates output from client MMUs, such as the client MMU units 212(0)-212(2).

Because the hardware page table walker(s) 224 of the central MMU unit 218 are shared between the client MMU units 212(0)-212(4), the distributed MMU architecture may provide chip area savings relative to monolithic MMUs 102(0)-102(3) for lower-performance computer processing systems. However, the distributed MMU architecture illustrated in FIG. 2B may incur both performance and area disadvantages that cause it to not scale well to mid- and high-performance computer processing systems. For example, in the event of a cache miss in one of the local translation caches 216(0)-216(4), the resulting memory access to the central translation cache 220 may suffer from a long latency, which may be further worsened in the event of a cache miss in the central translation cache 220. In addition, because the central translation cache 220 is shared among the client MMU units 212(0)-212(4), a thrashing condition may occur, and/or space within the central translation cache 220 may be insufficient for all of the client MMU units 212(0)-212(4). Moreover, the chip area required for the distributed MMU architecture may increase due to the interconnects between each client MMU unit 212(0)-212(4) and the central MMU unit 218, as well a dedicated port 232 to the memory controller interconnect 228.

Figure 3A:
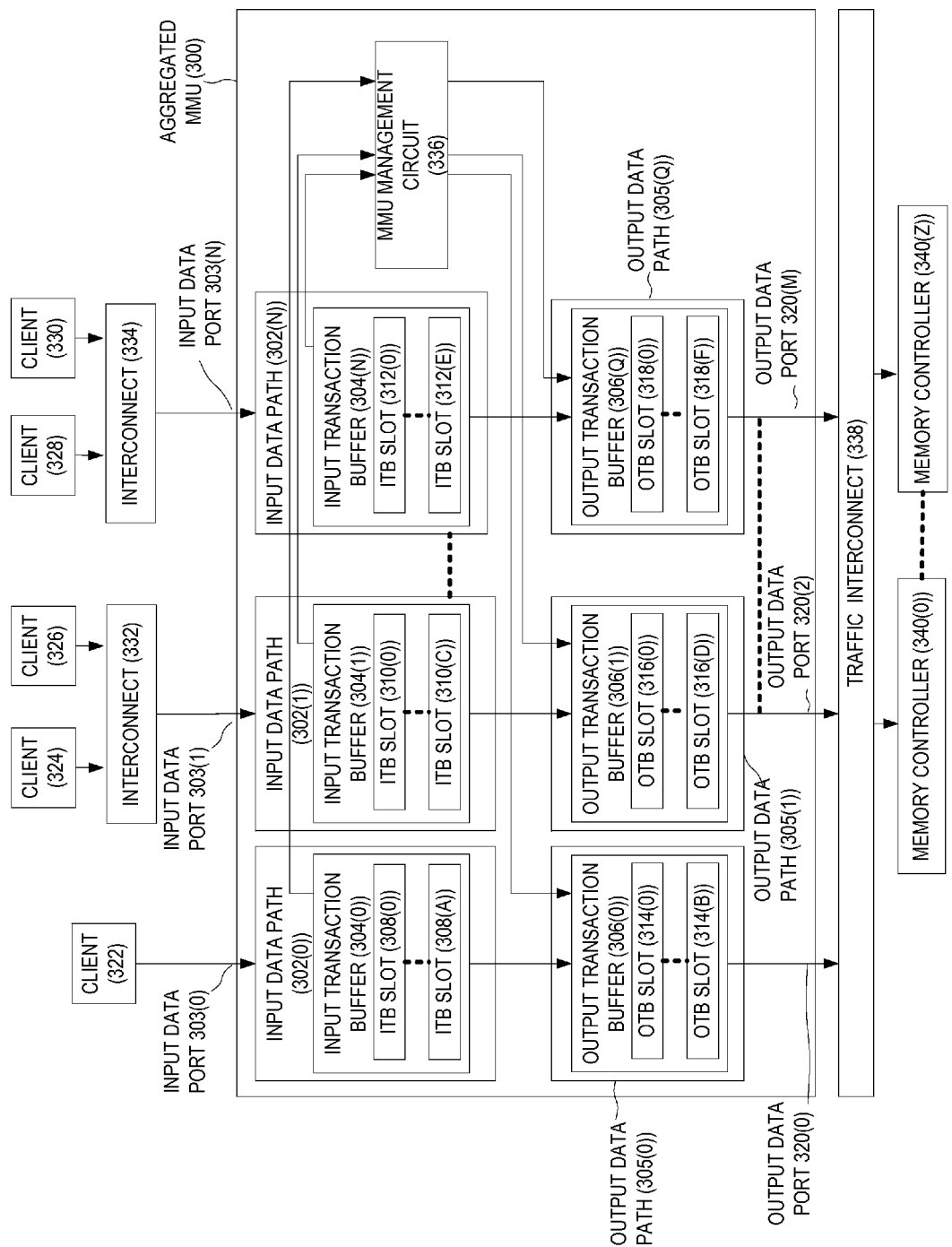
FIGS. 3A-3C are block diagrams of exemplary aggregated MMUs providing memory management functionality while reducing chip area requirements relative to monolithic MMUs and distributed MMUs.

Accordingly, to address the shortcomings of both the monolithic MMU architecture of FIG. 2A and the distributed MMU architecture of FIG. 2B, an aggregated MMU is provided. In this regard, FIG. 3A illustrates an exemplary aggregated MMU 300. It is to be understood that the aggregated MMU 300 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

The aggregated MMU 300 provides a plurality of input data paths 302(0)-302(N) connected to a corresponding plurality of input data ports 303(0)-303(N). Each of the input data paths 302(0)-302(N) provides a respective input transaction buffer 304(0)-304(N), and is associated with an output data path 305(0)-305(Q) providing a respective output transaction buffer 306(0)-306(Q). The input transaction buffers 304(0)-304(N) include input transaction buffer slots ("ITB SLOT") 308(0)-308(A), 310(0)-310(C), and 312(0)-312(E), respectively, while the output transaction buffers 306(0)-306(Q) include respective output transaction buffer slots ("OTB SLOT") 314(0)-314(B), 316(0)-316(D), and 318(0)-318(F). Because each input data path 302(0)-302(N) includes its own input transaction buffer 304(0)-304(N) that is not shared with other input data paths 302(0)-302(N), data passing through one of the input data paths 302(0)-302(N) does not intermix with data from input data paths 302(0)-302(N). Consequently, the aggregated MMU 300 may prevent an aggressive client from occupying all of the input transaction buffer slots 308(0)-308(A), 310(0)-310(C), and 312(0)-312(E), as may occur in the distributed MMU architecture discussed above.

The aggregated MMU 300 further provides a plurality of output data ports 320(0)-320(M). In the example of FIG. 3A, the number N of input data ports 303(0)-303(N) is the same as the number M of output data ports 320(0)-320(M). However, as discussed in greater detail below with respect to FIG. 3B, some aspects may provide that the number N of input data ports 303(0)-303(N) may be greater than the number M of output data ports 320(0)-320(M). According to some aspects disclosed herein, each of the input data paths 302(0)-302(N) may be independently clocked to provide a higher or lower clock frequency relative to a clock frequency of the aggregated MMU 300. This may result in reduced power consumption by the aggregated MMU 300.

As seen in FIG. 3A, the aggregated MMU 300 is configured to receive pre-translation transactions (e.g., the pre-translation write transaction 10 of FIG. 1A and/or the pre-translation read transaction 38 of FIG. 1B) from traffic-producing clients 322, 324, 326, 328, and 330 via the input data ports 303(0)-303(N) to the input data paths 302(0)-302(N). It is to be understood that, in some aspects, more or fewer traffic-producing clients may be serviced by the aggregated MMU 300 than illustrated in FIG. 3A. The aggregated MMU 300 may be communicatively coupled directly to a client, as is the case with client 322, or may receive a multiplexed stream of data from an interconnect, such as interconnects 332 and 334. An MMU management circuit 336 of the aggregated MMU 300 is responsible for retrieving a MATR (e.g., the MATR 12 of FIG. 1A and/or the MATR 40 of FIG. 1B) for each pre-translation transaction from the input transaction buffers 304(0)-304(N), performing memory address translation operations to generate a corresponding TMAF (e.g., the TMAF 30 of FIG. 1A and/or the TMAF 56 of FIG. 1B), and providing the TMAF to the output transaction buffers 306(0)-306(Q) located within the output data paths 305(0)-305(Q). Exemplary constituent elements and operations of the MMU management circuit 336 are discussed in greater detail below with respect to FIGS. 4 and 5A-5F. The TMAF is combined with a corresponding request payload (e.g., the WRP 14 of FIG. 1A and/or the RRP 42 of FIG. 1B) as a post-translation transaction (e.g., the post-translation write transaction 32 of FIG. 1A and/or the post-translation read transaction 58 of FIG. 1B), which is then output via the output data paths 305(0)-305(Q) to a traffic interconnect 338 via the output data ports 320(0)-320(M). The traffic interconnect 338 may then provide the post-translation transaction to memory controllers 340(0)-340(Z).

Figure 3B:
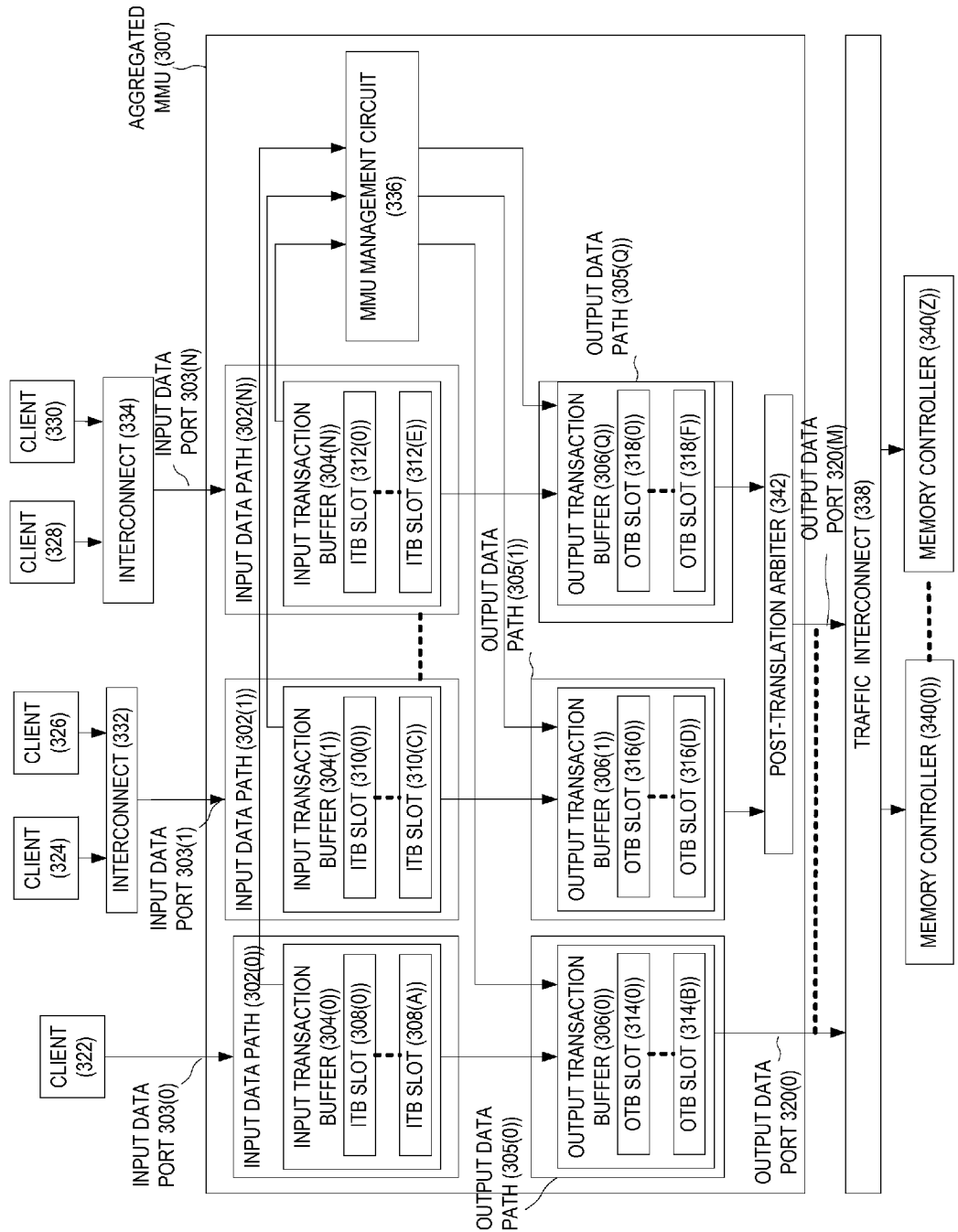

As noted above, some aspects of the aggregated MMU 300 may provide that the number N of input data ports 303(0)-303(N) is greater than the number M of output data ports 320(0)-320(M). In this regard, FIG. 3B illustrates an exemplary aggregated MMU 300'. The aggregated MMU 300' includes the same constituent elements of the aggregated MMU 300 of FIG. 3A, and further provides a post-translation arbiter 342 for combining traffic from the output data paths 305(0)-305(Q) into a single output data port 360(M) after memory address translation has taken place. In the example of FIG. 3B, the post-translation arbiter 342 may receive multiple post-translation transactions (not shown) from the output data paths 305(1)-305(Q), and may select a post-translation transaction to be output to the output data port 320(M) based a post-translation QoS arbitration. The post-translation QoS arbitration carried out by the post-translation arbiter 342 may comprise any QoS arbitration method known in the art, including but not limited to round robin arbitration, priority round robin arbitration, strict priority arbitration, credit-based arbitration, first-in-first-out arbitration, weighted round-robin arbitration, age-based arbitration, dynamic priority arbitration, random arbitration, fair-rate arbitration and/or any other form of arbitration.

Figure 3C:
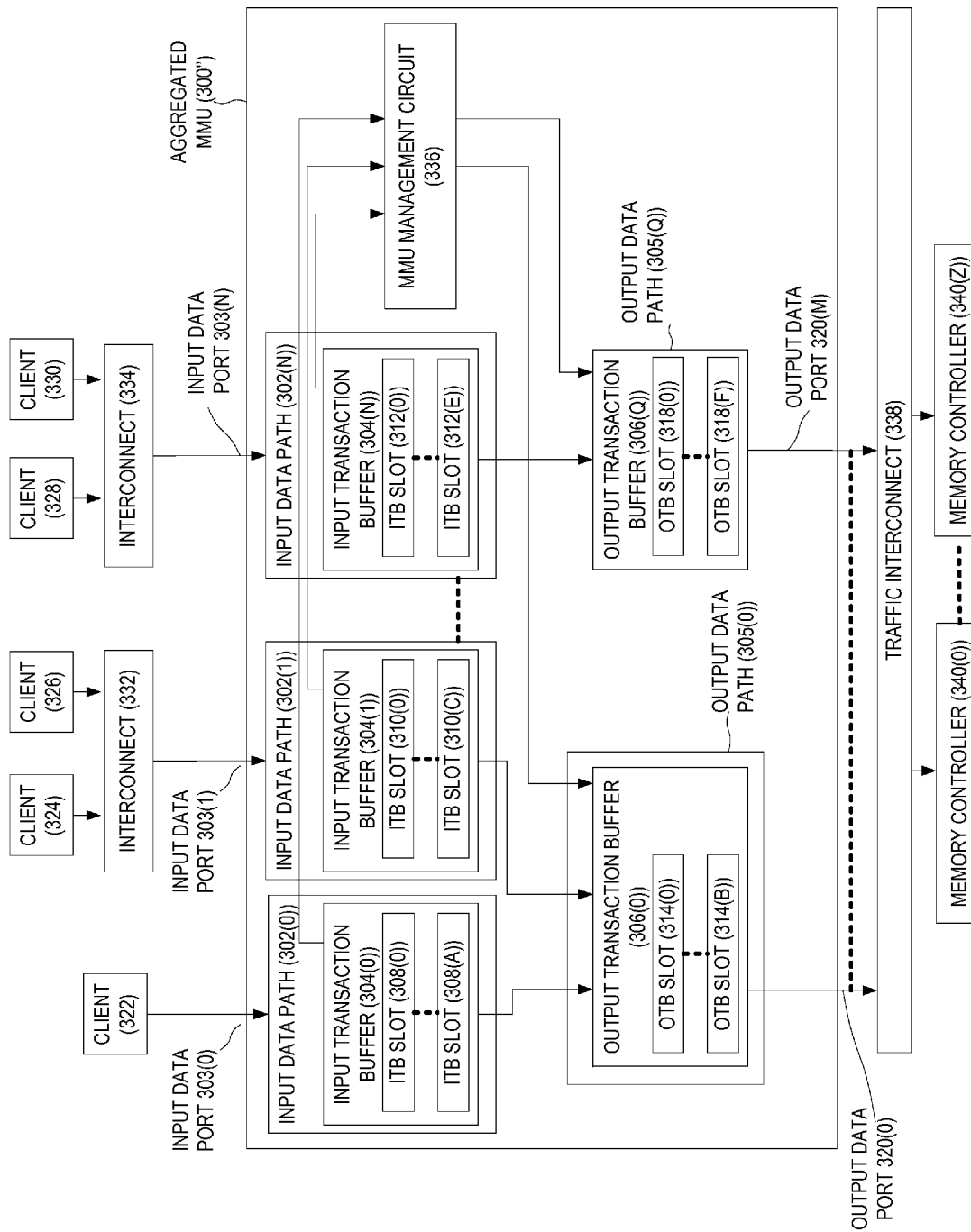

Some aspects of the aggregated MMU 300 may provide that the number N of input data paths 302(0)-302(N) is greater than the number Q of output data paths 305(0)-305(Q). In this regard, FIG. 3C illustrates an exemplary aggregated MMU 300". The aggregated MMU 300" is similar to all aspects of the aggregated MMU 300 of FIG. 3A, except that the aggregated MMU 300" provides a number Q of output data paths 305(0)-305(Q) that is smaller than the number N of input data paths 302(0)-302(N). In the aggregated MMU 300", the MMU management circuit 336 directs the traffic from multiple input data paths to one shared output data path. In the example of FIG. 3C, traffic from the input data paths 302(0) and 302(1) are combined into a single shared output data path 305(0) after memory address translation has taken place. The output data path 305(0) of FIG. 3C may receive multiple post-translation transactions from the input data paths 302(0)-302(1), and may select a transaction to be transferred into the output transaction buffer slots 314(0)-314(B) based on a post-translation QoS arbitration between the input data paths 302(0) to 302(1). The post-translation QoS arbitration carried out by the output data path 305(0) may comprise any QoS arbitration method known in the art, including but not limited to round-robin arbitration, priority round-robin arbitration, strict priority arbitration, credit-based arbitration, first-in-first-out arbitration, weighted round-robin arbitration, age-based arbitration, dynamic priority arbitration, random arbitration, fair-rate arbitration and/or any other form of arbitration.

In circumstances in which the output data path 305(0) is shared among multiple input data paths 302(0)-302(1), it may be desirable to ensure that no transactions from one input data path 302(0)-302(1) occupies all output transaction buffer slots 314(0)-314(B), and thus prevents other input data paths 302(0)-302(1) from transmitting their transactions to the shared output data path 305(0). In addition, it may be desirable to ensure that lower priority transactions (e.g., as indicated by the QoS attributes 24, 28 of FIG. 1A and/or the QoS attributes 50, 54 of FIG. 1B) do not occupy all output transaction buffer slots 314(0)-314(B), thus temporarily denying higher priority transactions access to the output transaction buffer slots 314(0)-314(B). To prevent these conditions, the shared output data path 305(0) in some aspects may be configured to allow for reservation of multiple subsets of the output transaction buffer slots 314(0)-314(B), each for exclusive use of transactions originating from one or more of the input data paths 302(0)-302(N) while allowing for the remainder of output transaction buffer slots 314(0)-314(B) to be shared among all input data paths 302(0)-302(N). According to some aspects, the shared output data path 305(0) in some aspects may be configured to allow for reservation of multiple subsets of the output transaction buffer slots 314(0)-314(B), each for exclusive use of transactions with a particular QoS attribute while allowing for the remainder of output transaction buffer slots 314(0)-314(B) to be shared among all transactions without differentiating on the basis of QoS attributes.

Figure 4:
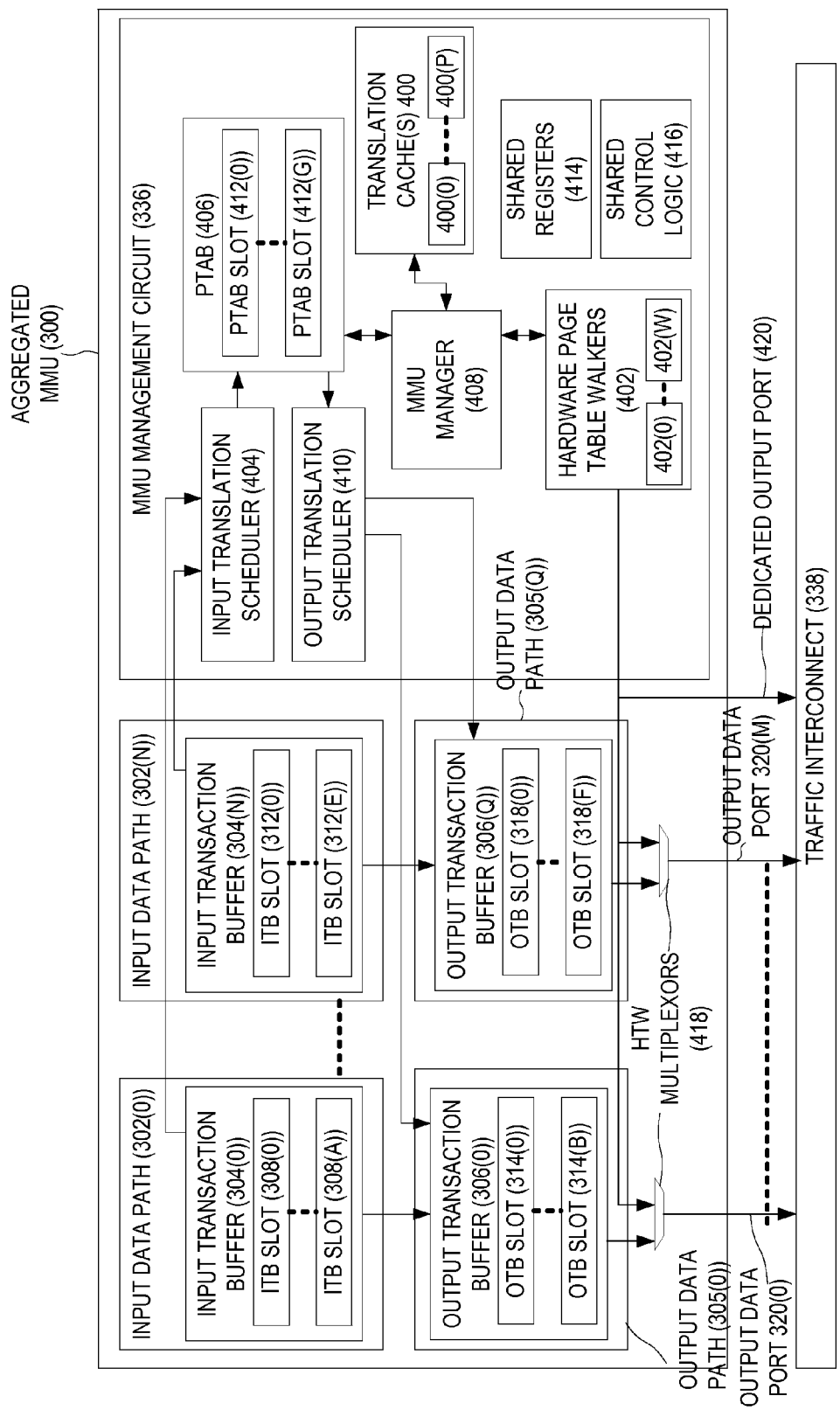
FIG. 4 is a block diagram showing further exemplary elements of an MMU management circuit of the aggregated MMU of FIGS. 3A-3C.

To better illustrate exemplary constituent elements of the MMU management circuit 336 of the aggregated MMU 300 of FIG. 3A according to some aspects, FIG. 4 is provided. In the example of FIG. 4, the MMU management circuit 336 may include one or more translation caches 400(0)-400(P), and one or more hardware page table walkers 402(0)-402(W). In some aspects, the one or more translation caches 400(0)-400(P) each may be shared among all input data paths 302(0)-302(N), or may be partitioned such that each of the translation caches 400(0)-400(P) can be shared among a subset of input data paths 302(0)-302(N) or dedicated to one or more of the input data paths 302(0)-302(N). Similarly, according to some aspects, each of the hardware page table walkers 402(0)-402(W) may be shared among all input data paths 302(0)-302(N), or partitioned such that each hardware page table walker 402(0)-402(W) can be shared among a subset of input data paths 302(0)-302(N) or dedicated to one or more input data path 302(0)-302(N). In some aspects, discussed in greater detail below with respect to FIGS. 5A-5F, the MMU management circuit 336 may be configured to use the one or more translation caches 400(0)-400(P) and/or the one or more hardware page table walkers 402(0)-402(W) when performing memory address translation operations based on a received MATR (e.g., the MATR 12 of FIG. 1A and/or the MATR 40 of FIG. 1B).

As seen in FIG. 4, the one or more translation caches 400(0)-400(P) and the one or more hardware page table walkers 402(0)-402(W) are proximal to the input data paths 302(0)-302(N) within the aggregated MMU 300, and may be shared among the input data paths 302(0)-302(N). By locating the one or more translation caches 400(0)-400(P) and the one or more hardware page table walkers 402(0)-402(W) in the proximity of the input data paths 302(0)-302(N), the aggregated MMU 300 in some aspects avoids unnecessary replication of cache resources, and eliminates the need for interconnects between local caches and a centralized cache. Avoiding the need for local and centralized caches may further improve performance of the aggregated MMU 300 relative to the distributed MMU architecture by eliminating cache access latency incurred in communicating between local caches and a centralized cache.

The MMU management circuit 336 of FIG. 4 may further include an input translation scheduler 404, a pending transaction address buffer (PTAB) 406, an MMU manager 408, and an output translation scheduler 410. The input translation scheduler 404 may be responsible for retrieving MATRs (e.g., the MATR 12 of FIG. 1A and/or the MATR 40 of FIG. 1B) from the input transaction buffers 304(0)-304(N) according to an input transaction QoS arbitration, and placing the MATRs into PTAB slots 412(0)-412(G) of the PTAB 406. The input transaction QoS arbitration within the input translation scheduler 404 may use the corresponding QoS attributes (e.g., the QoS attributes 24, 28 of FIG. 1A and/or the QoS attributes 50, 54 of FIG. 1B) of multiple eligible MATRs from the input data paths 302(0)-302(N) to perform arbitration to determine which MATR to admit to an available PTAB slot 412(0)-412(G). As non-limiting examples, the input transaction QoS arbitration may include any QoS arbitration method known in the art, including but not limited to round-robin arbitration, priority round-robin arbitration, strict priority arbitration, credit-based arbitration, first-in-first-out arbitration, weighted round-robin arbitration, age-based arbitration, dynamic priority arbitration, random arbitration, fair-rate arbitration and/or any other form of arbitration.

The MMU manager 408 may then select a pending MATR from the PTAB 406 using QoS arbitration based on QoS attributes of the eligible MATRs in the PTAB 406, and may employ the one or more translation caches 400(0)-400(P) and/or the one or more hardware page table walkers 402(0)-402(W) to generate a TMAF (e.g., the TMAF 30 of FIG. 1A and/or the TMAF 56 of FIG. 1B), which is then placed in the corresponding PTAB slot 412(0)-412(G). The output translation scheduler 410 may then select a completed TMAF from the PTAB 406 using QoS arbitration, and may schedule a corresponding request payload (e.g., the WRP 14 of FIG. 1A and/or the RRP 42 of FIG. 1B) to be moved from the input data path 302(0)-302(N) to the corresponding output data path 305(0)-305(Q). The output translation scheduler 410 provides the TMAF to the corresponding output data path 305(0)-305(Q), where it is combined with the request payload to create the post-translation transaction (e.g., the post-translation write transaction 32 of FIG. 1A and/or the post-translation read transaction 58 of FIG. 1B) within an output transaction buffer slot 314(0)-314(B), 318(0)-318(F). The post-translation transaction is then output to one of the output data ports 320(0)-320(M). In this manner, the QoS features provided by the input translation scheduler 404, the MMU manager 408, and the output translation scheduler 410 ensure that high priority transactions are given preferential translation resources and are not starved.

Operations of the input translation scheduler 404, the PTAB 406, the MMU manager 408, and the output translation scheduler 410 in processing a MATR to generate a memory address translation result are discussed in greater detail below with respect to FIGS. 5A-5F.

The MMU management circuit 336, in some aspects, may also include shared registers 414 and shared control logic 416. The shared registers 414 and the shared control logic 416 may be used by the aggregated MMU 300 to provide memory management functionality to all of the input data paths 302(0)-302(N). This is in contrast to the distributed MMU architecture shown in FIG. 2B, in which much of the registers and control logic required for memory management are replicated at the local translation caches 216(0)-216(4) and the central translation cache 220. The use of the shared registers 414 and the shared control logic 416 by the aggregated MMU 300 further contrasts with the monolithic MMU architecture of FIG. 2A, in which all registers and control logic are replicated in each of the monolithic MMUs 102(0)-102(3). By using the shared registers 414 and the shared control logic 416, the aggregated MMU 300 may achieve sizable chip area savings. In addition, software overhead may be reduced in computer systems using the aggregated MMU 300 by reducing a number of MMU instances to manage and control by software.

In some aspects, the one or more hardware page table walkers 402(0)-402(W) may translate a virtual address to a physical address through a series of transactions (not shown) that access page tables in system memory (not shown). The transactions originating from the one or more hardware page table walkers 402(0)-402(W) may be multiplexed with transactions from the output data paths 305(0)-305(Q) using hardware table walker (HTW) multiplexors 418. The HTW multiplexors 418 may use QoS attributes of the transactions from the one or more hardware page table walkers 402(0)-402(W) and the transactions from the output data paths 305(0)-305(Q) to apply QoS arbitration to select between transactions from the two sources and transmit each selected transaction to the corresponding output data port 320(0)-320(M). According to some aspects, some or all of the transactions from the one or more hardware page table walkers 402(0)-402(W) may be routed to a dedicated output port 420 used exclusively for emitting transactions from the hardware page table walkers 402(0)-402(W) to the traffic interconnect 338. Transactions from the one or more hardware page table walkers 402(0)-402(W) may be directed to exit the aggregated MMU 300 through an output data port 320(0)-320(M) or the dedicated output port 420 based on considerations such as an address of each transaction's final destination in the traffic interconnect 338, a need to ensure that the outputting of the transactions from the one or more hardware page table walkers 402(0)-402(W) does not interfere with the flow of transactions from the output data paths 305(0)-305(Q), and/or a desire to provide the transactions from the one or more hardware page table walkers 402(0)-402(W) with higher priority and/or a separate path into the traffic interconnect 338, as non-limiting examples.

Figure 5A:
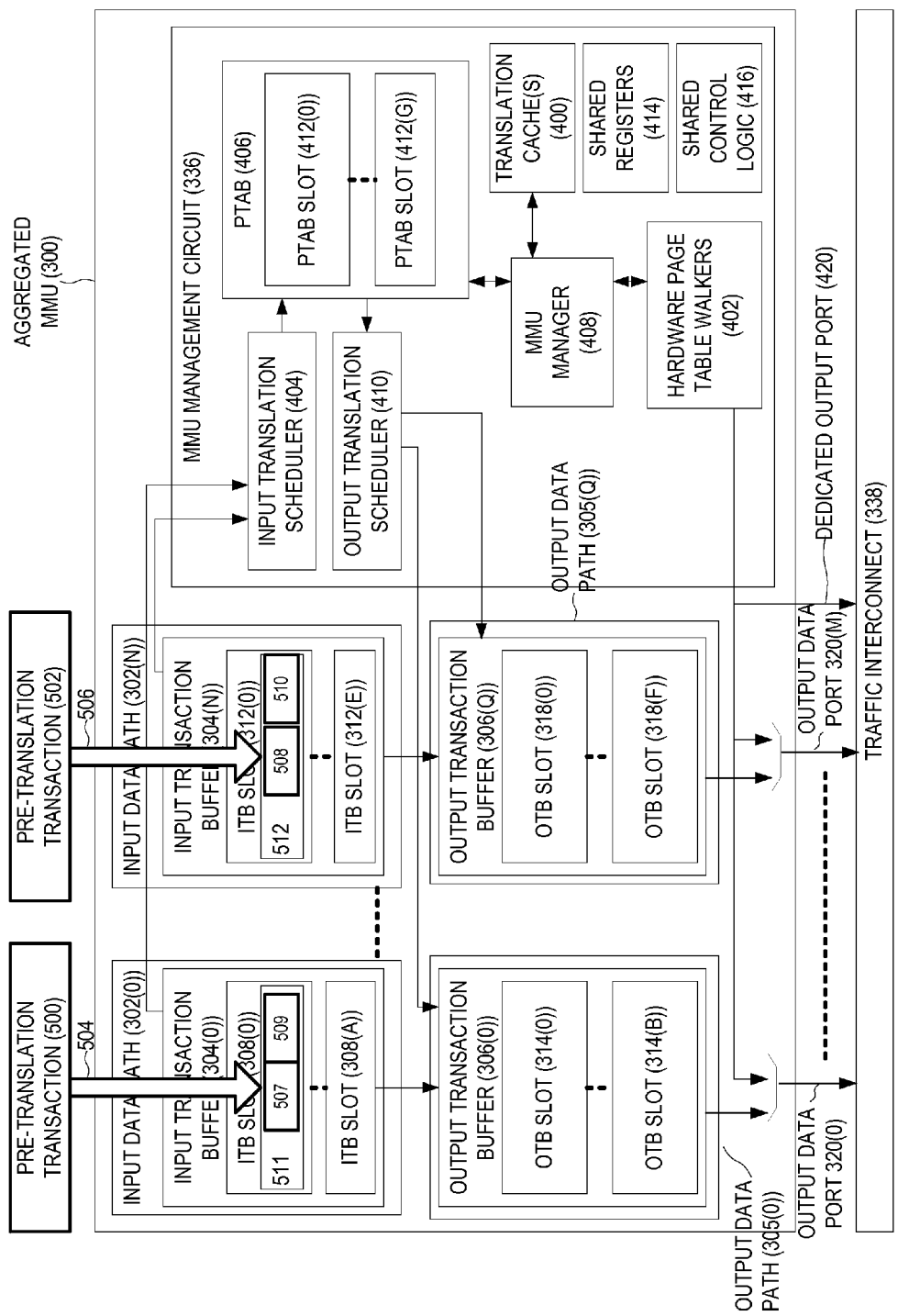
FIGS. 5A-5F are block diagrams illustrating end-to-end processing of a memory address translation request (MATR) by the aggregated MMU of FIG. 4 and the constituent elements thereof.
Figure 5B:
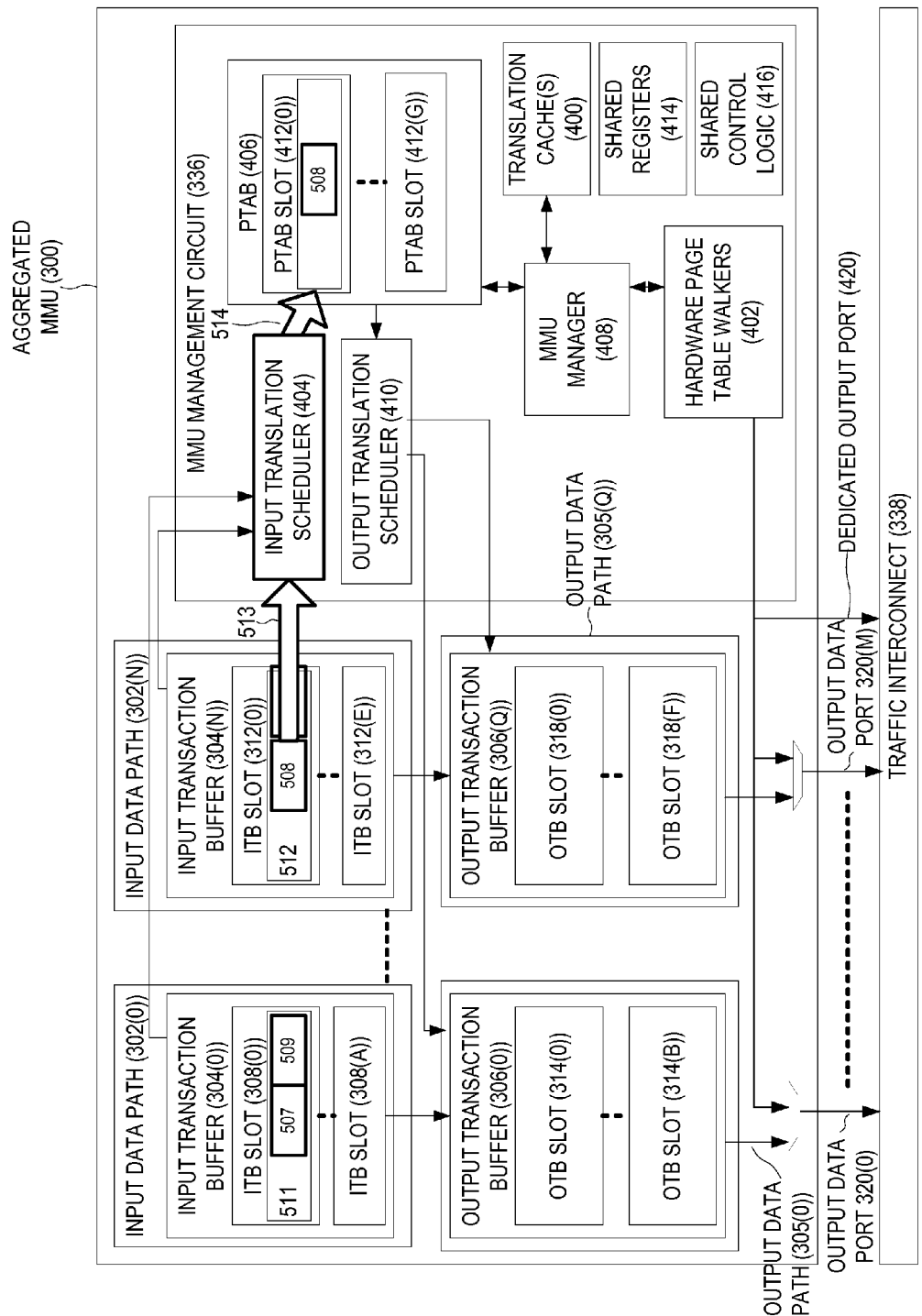
Figure 5C:
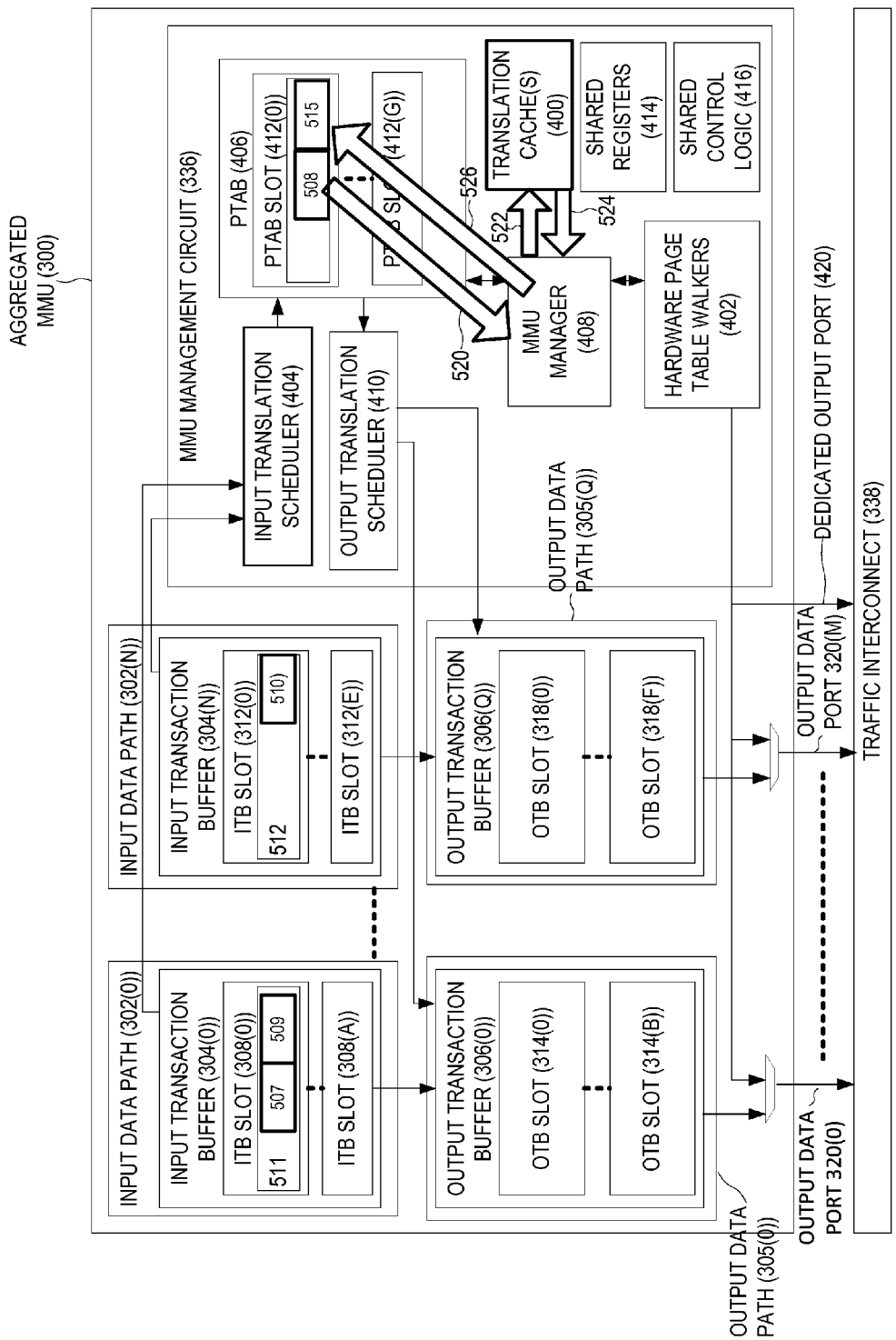
Figure 5D:
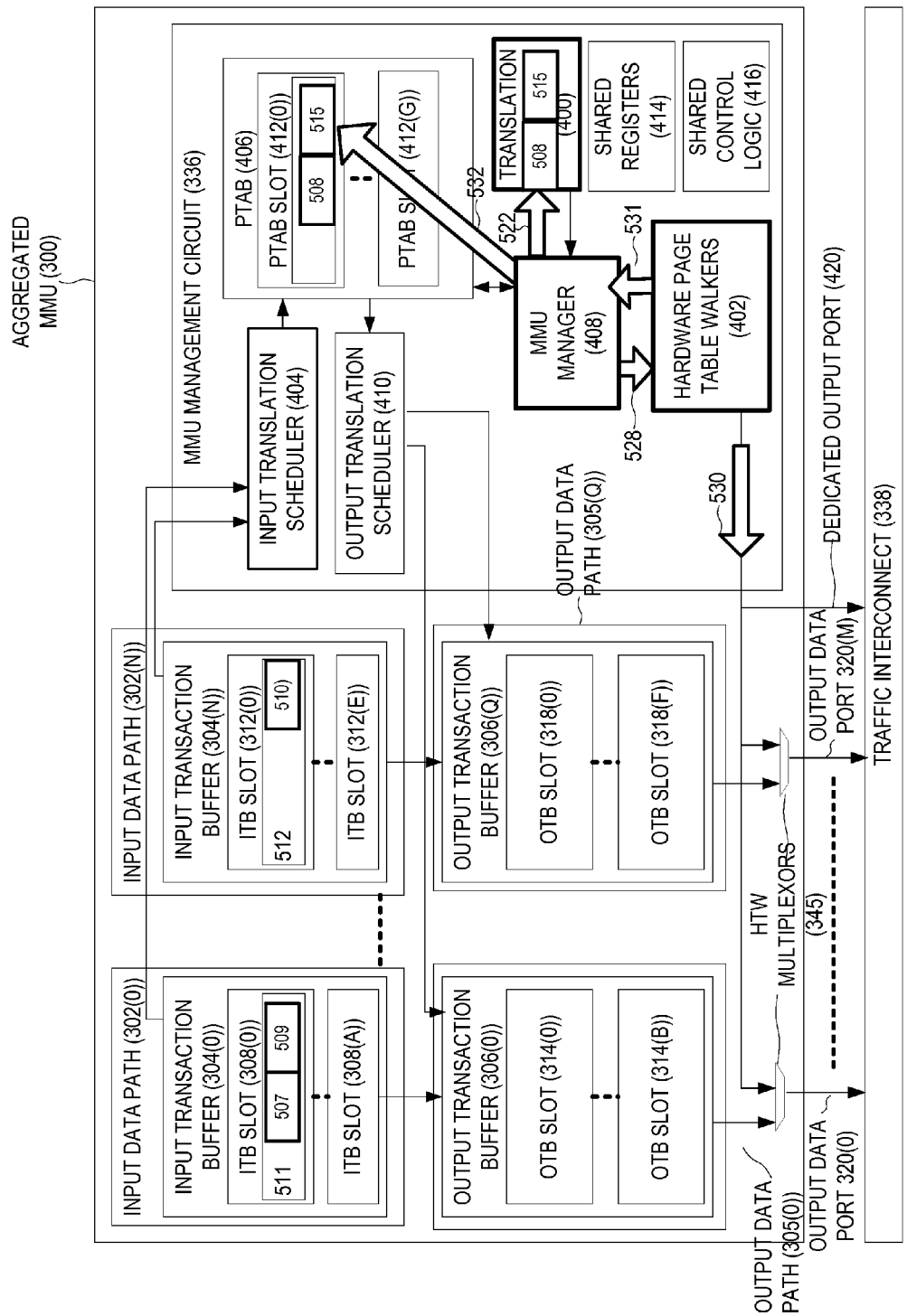
Figure 5E:
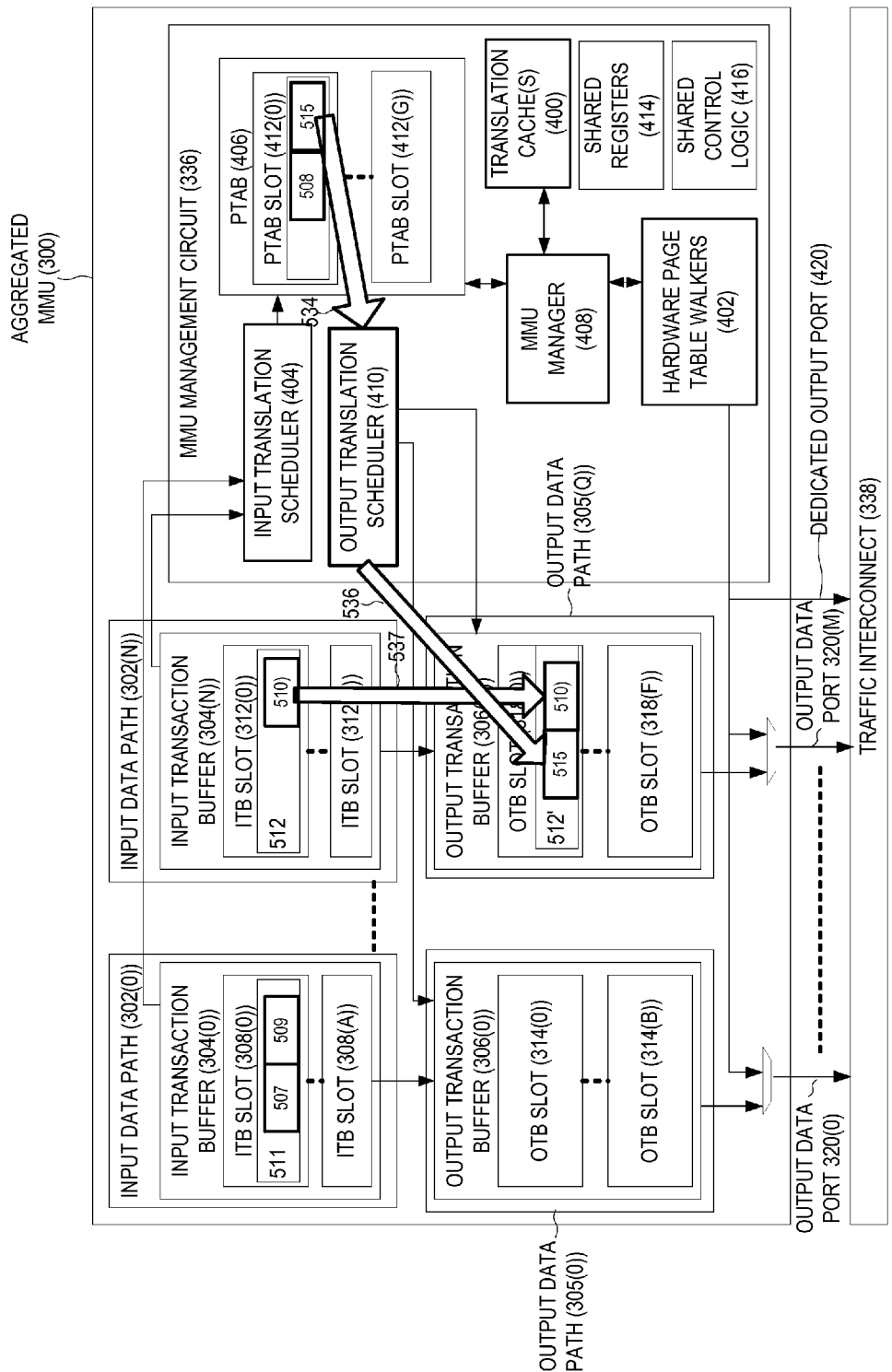
Figure 5F:
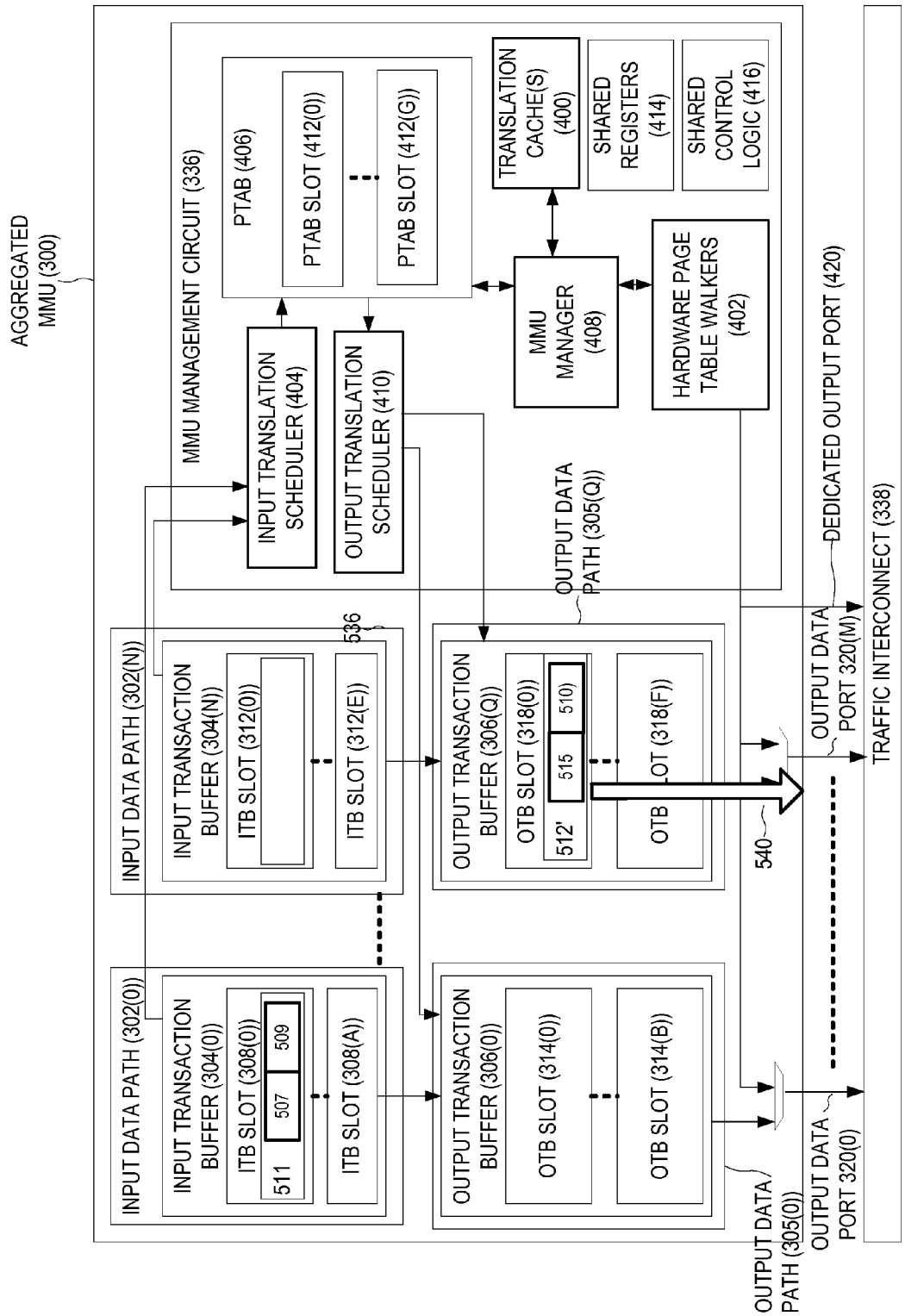

FIGS. 5A-5F are block diagrams provided to better illustrate operations of the input translation scheduler 404, the PTAB 406, the MMU manager 408, and the output translation scheduler 410 of some aspects of the aggregated MMU 300 of FIG. 4 during processing of a MATR. In this regard, FIG. 5A illustrates input buffering of incoming MATRs as input transactions, and FIG. 5B shows operations of the input translation scheduler 404 for selecting an input transaction for transfer to the PTAB 406 for processing. FIG. 5C illustrates how the MMU manager 408 may employ the one or more translation caches 400(0)-400(P) to obtain a cached memory address translation result, while FIG. 5D shows the MMU manager 408 using the one or more hardware page table walkers 402(0)-402(W) to perform address translation from a virtual address to a physical address. FIG. 5E illustrates operations of the output translation scheduler 410 for scheduling the move of a completed TMAF from the PTAB 406 to an output data path 305(0)-305(Q), and FIG. 5F shows the completed post-translation transaction being output via the output data paths 305(0)-305(Q) to the output data ports 320(0)-320(M). For the sake of clarity, elements of FIG. 4 are referenced in describing FIGS. 5A-5F.

Referring now to FIG. 5A, operations of the aggregated MMU 300 for providing memory management functionality according to some aspects begins with pre-translation transactions 500, 502 being received by the aggregated MMU 300 via the input data ports (not shown) to the input data paths 302(0) and 302(N), respectively, as indicated by arrows 504 and 506. It is to be understood that the pre-translation transactions 500, 502 may comprise pre-translation write transactions such as the pre-translation write transaction 10 of FIG. 1A and/or pre-translation read transactions such as the pre-translation read transaction 38 of FIG. 1B. In the example of FIG. 5A, the pre-translation transactions 500, 502 contain MATRs 507, 508 respectively, and request payloads 509, 510, respectively. The MATRs 507, 508 may be received embedded in the pre-translation transactions 500, 502 from traffic-producing clients (not shown) communicatively coupled to the aggregated MMU 300, such as the clients 322, 324, 326, 328, and 330 of FIG. 3A. As seen in FIG. 5A, the pre-translation transaction 500 is stored as an input transaction 511 in the input translation buffer slot 308(0) of the input transaction buffer 304(0) of the input data path 302(0). Likewise, the pre-translation transaction 502 is stored as an input transaction 512 in the input translation buffer slot 312(0) of the input transaction buffer 304(N) of the input data path 302(N). The MATRs 507, 508 portions of the pre-translation transactions 500, 502 then await processing by the input translation scheduler 404.

In FIG. 5B, operations of the input translation scheduler 404 according to some aspects of the aggregated MMU 300 are shown. The input translation scheduler 404 is responsible for selecting a MATR (in the example of FIG. 5B, the MATR 508, as indicated by arrow 513) from the input transaction buffers 304(0)-304(N) by applying a QoS arbitration mechanism whereby QoS attributes of each MATR 507, 508 indicate the relative priority of the respective MATRs 507, 508. The input translation scheduler 404 then schedules the selected MATR 508 to be stored by the PTAB 406. As indicated by arrow 514 in FIG. 5B, the PTAB 406 then stores the MATR 508 that was selected and scheduled by the input translation scheduler 404 as a pending translation within the PTAB slot 412(0).

By applying the input transaction QoS arbitration when selecting the MATR 508, the input translation scheduler 404 may maintain a desired QoS level among the different input data paths 302(0)-302(N). In some aspects, the input QoS arbitration may seek to ensure that no one traffic-producing client is allowed to monopolize the PTAB 406, and/or to grant greater access to the PTAB 406 to some transactions residing in the input data paths 302(0)-302(N) if they have higher priority relative to other transactions as indicated by QoS attributes for each transaction. Some aspects may provide that the input transaction QoS arbitration may be configured dynamically to partition the PTAB slots 412(0)-412(G) into groups of one or more PTAB slots 412(0)-412

(G). Each group may be reserved for exclusive use in a dedicated, non-shared method for one or more input data paths 302(0)-302(N) and/or for the input transactions 511, 512 having a predetermined level of high priority as indicated by QoS attribute fields, while sharing the remaining PTAB slots 412(0)-412(G) between all the transactions 511, 512 from all input data paths 302(0)-302(N) and/or all priority levels for all transactions. In some aspects, the input translation scheduler 404 may ensure that, for the selected MATR 508 received from the input transaction buffers 304(0)-304(N), there exists at least one available output transaction buffer slot 318(0)-318(F) in the corresponding output transaction buffer 306(Q) before the selected MATR 508 is stored in the PTAB 406.

In some aspects, once the MATR 508 is selected and placed in an available PTAB slot 412(0) of the PTAB 406, the input translation scheduler 404 may examine a fill level of the PTAB 406 to determine whether unoccupied slots 412(0)-412(G) exist within the PTAB 406. If so, the input translation scheduler 404 may apply successive QoS arbitration between all remaining MATRs in all input transaction buffer slots 308(0)-308(A), 312(0)-312(E) within all input transaction buffers 304(0)-304(N) to select MATRs 507, 508 for insertion into the unoccupied PTAB slots 412(0)-412(G). There may be temporary circumstances when MATRs cannot be moved into available PTAB slots 412(0)-412(G) if the available PTAB slots 412(0)-412(G) are pre-reserved for MATRs from specific input data paths 302(0)-302(N), or if the PTAB slots 412(0)-412(G) are reserved for MATRs of a particular priority level, and these conditions are not met by any of the MATRs that exist in the input transaction buffers 304(0)-304(N). In such circumstances, the input translation scheduler 404 may monitors the available PTAB slots 412(0)-412(G) in the PTAB 406 until a PTAB slot 412(0)-412(G) that meets the reservation criteria becomes available. Once a suitable PTAB slot 412(0)-412(G) becomes available, the input translation scheduler 404 applies QoS arbitration to select a MATR for movement into the newly released PTAB slot 412(0)-412(G).

FIG. 5C illustrates operations of the MMU manager 408 for performing translation operations on a virtual address (not shown) of the MATR 508 to generate a TMAF 515, according to some aspects of the aggregated MMU 300. In the example of FIG. 5C, the MMU manager 408 monitors the PTAB 406 to detect the addition of pending MATRs, such as the pending MATR 508, for which a TMAF has not been created. Upon detection of the pending MATR 508, the MMU manager 408 selects the pending transaction MATR 508 from among the pending MATRs within the PTAB 406, as indicated by arrow 520. In some aspects, the pending MATR 508 may be selected based on a QoS arbitration. This may enable the MMU manager 408 to ensure that high-priority pending MATRs within the PTAB 406 are processed before low-priority transactions.

The MMU manager 408 then determines whether the one or more translation caches 400(0)-400(P) contains a cached entry that translates the virtual address and the corresponding access attributes (not shown) in the MATR 508 to a corresponding physical address (not shown), as indicated by arrow 522. If a translation is found, the one or more translation caches 400(0)-400(P) returns the physical address to the MMU manager 408 as indicated by arrow 524. The MMU manager 408 then constructs a TMAF 515 which contains the physical address obtained from the one or more translation caches 400. The TMAF 515 also contains access attributes, which may be the same version or a modified version of the input access attributes of the MATR 508 based on the implementation of the shared control logic 416 and the shared registers 414. The TMAF 515 also contains QoS attributes (not shown) and access attributes, which may be the same version or a modified version of the QoS attributes and the access attributes of the MATR 508 based on the implementation of the shared control logic 414 and the shared registers 416. Once the TMAF 515 is constructed, it is placed in the corresponding PTAB slot 412(0), as indicated by arrow 526. The pending TMAF 515 in the PTAB slot 412(0) may then be marked as eligible for consideration by the output translation scheduler 410.

Referring now to FIG. 5D, if the translation for the physical address is not cached within the one or more translation caches 400, or if only a partial translation exists, the MMU manager 408 assigns one of the one or more hardware page table walkers 402(0)-402(W) to generate the complete TMAF 515, as indicated by arrow 528. In some aspects, the MMU manager 408 may assign one of the one or more hardware page table walkers 402 based on a predetermined QoS arbitration policy. In this manner, the MMU manager 408 may ensure that no set of translation requests from any one input data path 302(0)-302(N) is able to monopolize all available hardware page table walkers 402. As non-limiting examples, the QoS arbitration policy may comprise assigning the one or more hardware page table walkers 402(0)-402(W) on a first-come-first-serve basis, or may be based on a priority of the pending MATR 508, as non-limiting examples. Some aspects may provide that the MMU manager 408 may also apply the QoS arbitration to reserve a configurable number of the one or more hardware page table walkers 402(0)-402(W) for exclusive use of one or more inactive input data paths 302(0)-302(N), while allowing the remaining one or more hardware page table walkers 402(0)-402(W) to be used by any input data path 302(0)-302(N) so that the input data paths 302(0)-302(N) are not blocked by a lack of available hardware page table walkers 402(0)-402(W) when traffic does arrive.

Some aspects may provide that the MMU manager 408 may also apply the QoS arbitration to reserve groups of the one or more hardware page table walkers 402, where each group contains one or more hardware page table walkers 402, for exclusive use of one or more input data paths 302(0)-302(N), while allowing the remaining ungrouped hardware page table walkers 402 to be used by any input data path 302(0)-302(N). In this manner, the input data paths 302(0)-302(N) are not blocked by a lack of available hardware page table walkers 402(0)-402(W) when traffic does arrive. According to some aspects, the MMU manager 408 may also apply the QoS arbitration to reserve groups of the one or more hardware page table walkers 402, where each group contains one or more hardware page table walkers 402, for exclusive use of MATRs with certain level or levels of priorities as indicated by their QoS attributes, while allowing the remaining ungrouped one or more hardware page table walkers 402 to be used any MATR with any level of priority. Accordingly, MATRs with higher priorities are not blocked by a lack of available hardware page table walkers 402(0)-402(W) when traffic does arrive.

In some aspects, the one or more hardware page table walkers 402(0)-402(W) are configured to perform the translation of the virtual address of the MATR 508 (e.g., by conducting one or more hardware page table walks) using the output data ports 320(0)-320(M), or through the dedicated output port 420 to the traffic interconnect 338 as indicated by arrow 530. In such aspects, the hardware page table walkers 402(0)-402(W) may selectively insert hardware page table walk transactions (not shown) inline into the output data ports 320(0)-320(M), along with other output transactions from the output data paths 305(0)-305(Q). Each of the one or more hardware page table walkers 402(0)-402 (W) may be configured to use one of the output data ports 320(0)-320(M), or may distribute traffic among multiple output data ports 320(0)-320(M) according to transaction priority or output data path congestion.

Upon completing the translation of the virtual address of the MATR 508, the one or more hardware page table walkers 402(0)-402(W) provide the translated physical address to the MMU manager 408, as indicated by the arrow 531. The MMU manager 408, in turn, receives the translated physical address from the one or more hardware page table walkers 402, and updates the one or more translation caches 400(0)-400(P) with the updated translation between the virtual address and the physical address of the MATR 508, as indicated by arrow 522. The MMU manager 408 also constructs the TMAF 515 and provides the TMAF 515 to the appropriate PTAB slot 412(0)-412(G) in the PTAB 406, as indicated by arrow 532.

In FIG. 5E, the output translation scheduler 410 in some aspects of the aggregated MMU 300 searches the PTAB slots 412(0)-412(G) of the PTAB 406 to locate slots where the MATR translation has been completed and a TMAF is available, such as the PTAB slot 412(0) in FIG. 5E. The output translation scheduler 410 then selects among available TMAFs in the PTAB 406. In the example of FIG. 5E, the output translation scheduler 410 selects the TMAF 515, as indicated by arrow 534. The output translation scheduler 410 then moves the TMAF 515 to the appropriate output transaction buffer slot 318(0) in the output transaction buffer 306(Q), as indicated by arrow 536.

Scheduling by the output translation scheduler 410 may be based on the QoS attributes of the TMAF 515 and a QoS arbitration scheme, which may take into account an availability of output transaction buffer slots 318(0)-318(F), and/or a relative priority of the pending MATFs, as non-limiting examples. The PTAB 406 dequeues the TMAF 515 into the output transaction buffer 306(Q) based on the QoS-based scheduling. The output transaction buffer 306(Q) then moves the request payload 510 from the input transaction buffer slot 312(0) to the output transaction buffer slot 318(0) as indicated by arrow 537, and combines it with the received TMAF 515 to create a post-translation transaction 512'. The post-translation transaction 512' is subsequently stored in the output transaction buffer slot 318(0). In some aspects, the output translation scheduler 410 may elevate a priority of the post-translation transaction 512' if there exist new input transactions (not shown) in the input transaction buffer 304(N) that have a higher priority than the post-translation transaction 512' in the output transaction buffer 306(Q). The memory address translation operations then conclude in FIG. 5F as the post-translation transaction 512' is output via the output data path 305(Q), as indicated by arrow 540.

Figure 6A:
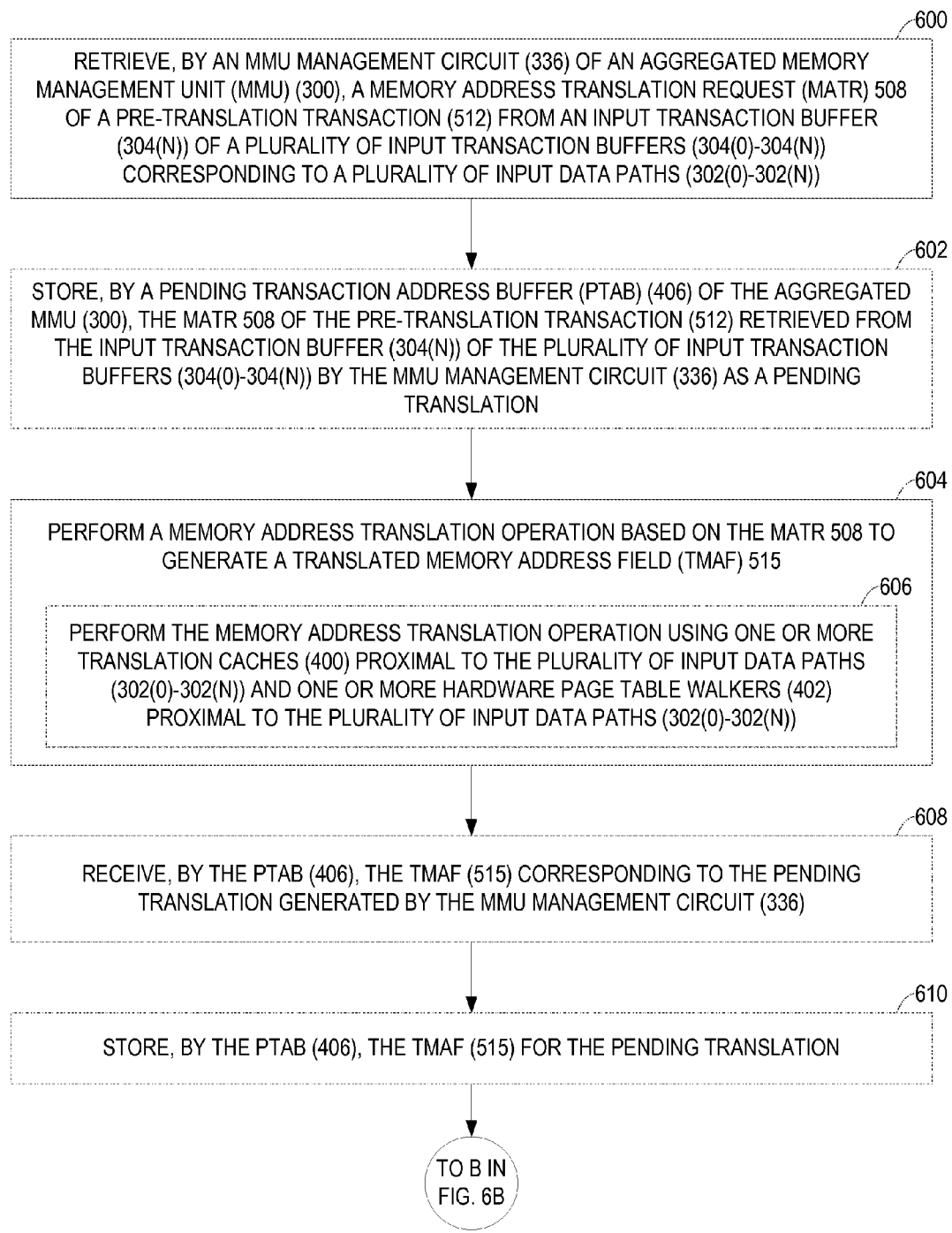
FIGS. 6A and 6B are flowcharts illustrating exemplary operations for providing memory management functionality by the exemplary aggregated MMU of FIG. 4.
Figure 6B:
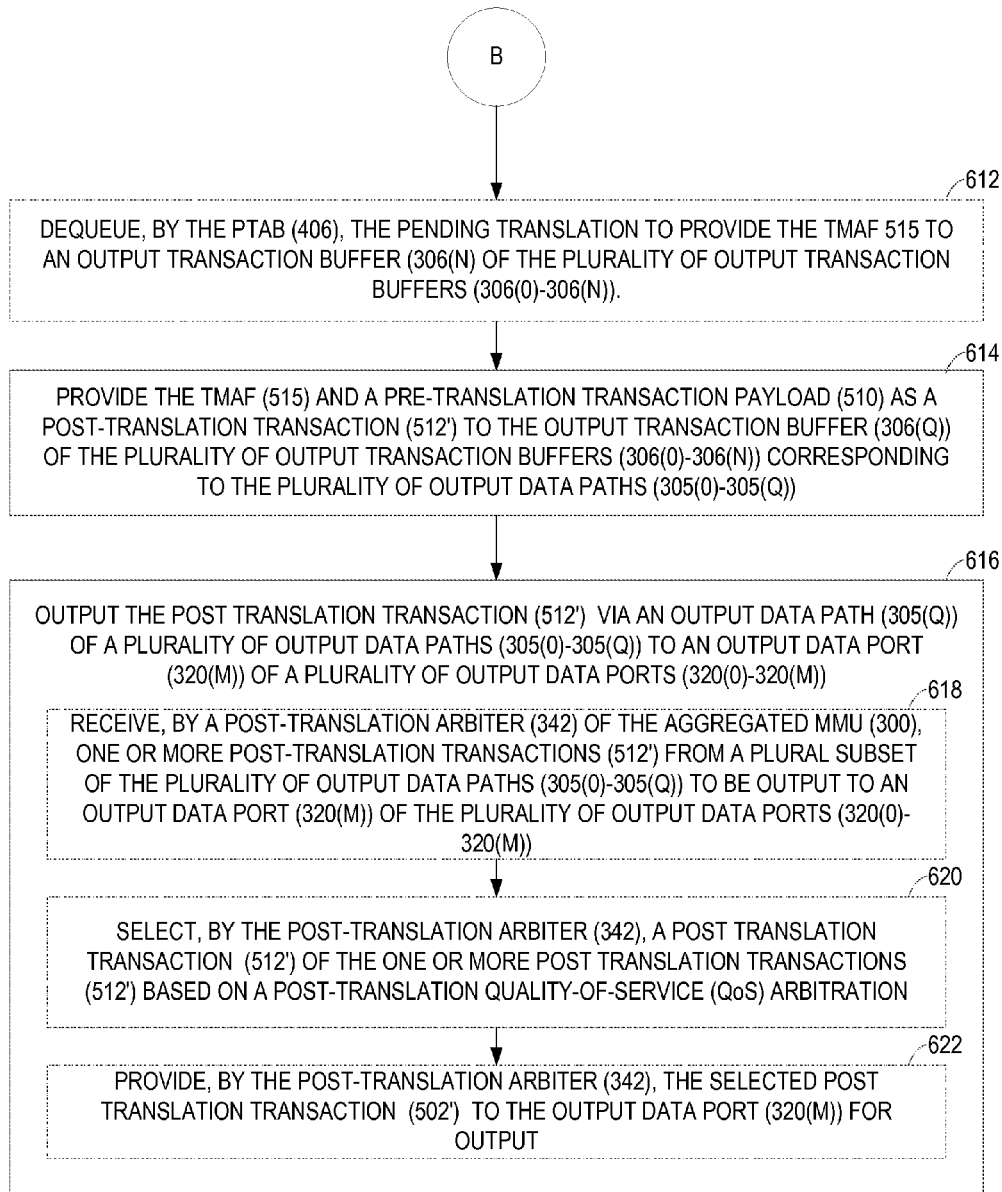

To illustrate exemplary operations for providing memory management functionality by the exemplary aggregated MMU 300 of FIG. 4, FIGS. 6A and 6B are provided. For the sake of clarity, elements of FIGS. 4 and 5A-5F are referenced in describing FIGS. 6A and 6B. Operations begin in FIG. 6A with the MMU management circuit 336 of the aggregated MMU 300 retrieving the MATR 508 of a pre-translation transaction 512 from the input transaction buffer 304(N) of the plurality of input transaction buffers 304(0)-304(N) corresponding to the plurality of input data paths 302(0)-302(N) (block 600). In this regard, the MMU management circuit 336 may be referred to herein as "a means for retrieving a memory address translation request (MATR) from an input transaction buffer of a plurality of input transaction buffers corresponding to a plurality of input data paths." In some aspects, the operations of block 600 for retrieving the MATR 508 are carried out by the input translation scheduler 404, as described in greater detail below with respect to FIG. 7. Some aspects may provide that the PTAB 406 of the aggregated MMU 300 next stores the MATR 508 of the pre-translation transaction 512 retrieved from the input transaction buffer 304(N) of the plurality of input transaction buffers 304(0)-304(N) by the MMU management circuit 336 as a pending translation (block 602).

The MMU management circuit 336 then performs a memory address translation operation based on the MATR 508 to generate a TMAF 515 (block 604). Accordingly, the MMU management circuit 336 may be referred to herein as "a means for performing a memory address translation operation based on the MATR to generate a translated memory address field (TMAF)." According to some aspects, the operations of block 604 for performing the memory address translation operation based on the MATR 508 are carried out by the MMU manager 408, as described in greater detail below with respect to FIGS. 9A and 9B. Some aspects may provide that performing the memory address translation operation may be accomplished using one of the one or more translation caches 400(0)-400(P) proximal to the plurality of input data paths 302(0)-302(N) and one or more hardware page table walkers 402(0)-402(W) proximal to the plurality of input data paths 302(0)-302(N) (block 606). In some exemplary aspects of the aggregated MMU 300, the PTAB 406 next receives the TMAF 515 corresponding to the pending translation generated by the MMU management circuit 336 (block 608). The PTAB 406 may then store the TMAF 515 for the pending translation (block 610). Processing then resumes at block 612 of FIG. 6B.

Referring now to FIG. 6B, in some aspects the PTAB 406 may dequeue the pending translation to provide the TMAF 515 to the output transaction buffer 306(Q) of the plurality of output transaction buffers 306(0)-306(Q) (block 612). Some aspects may provide that the TMAFs 515 that correspond to MATRs 508 from a subset of the plurality of input data paths 302(0)-302(N) may be dequeued into a single output transaction buffer 306(Q), while according to some aspects there may be a one-to-one correspondence between the input data paths 302(0)-302(N) and the output transaction buffers 306(0)-306(Q).

The TMAF 515 and a pre-translation transaction payload 510 is then provided as a post-translation transaction 512' to the output transaction buffer 306(Q) of the plurality of output transaction buffers 306(0)-306(Q) corresponding to the plurality of output data paths 305(0)-305(Q) (block 614). Some aspects may provide that the operations of block 614 for providing the TMAF 515 to the output transaction buffer 306(Q) are carried out by the output translation scheduler 410, as described in greater detail below with respect to FIG. 8. The output translation scheduler 410 thus may be referred to herein as "a means for providing the TMAF and a pre-translation transaction payload as a post-translation transaction to an output transaction buffer of a plurality of output transaction buffers corresponding to the plurality of input data paths."

The post-translation transaction 512' containing the TMAF 515 is subsequently output via the output data path 305(Q) of the plurality of output data paths 305(0)-305(Q) to the output data port 320(M) of the plurality of output data ports 320(0)-320(M) (block 616). In this regard, the output data path 305(Q) may be referred to herein as "a means for outputting the post-translated transaction to an output data port of a plurality of output data ports." In some aspects, the operations for outputting the post-translation transaction 512' may include the post-translation arbiter 342 of FIG. 3B receiving one or more post-translation transactions 512' from a plural subset of the plurality of output data paths 305(0)-305(Q) to be output to the output data port 320(M) of the plurality of output data ports 320(0)-320(M) (block 618). The post-translation arbiter 342 may select the post-translation transaction 512' of the one or more post-translation transactions 512' based on a post-translation QoS arbitration (block 620). The selected post-translation transaction 512' may then be provided by the post-translation arbiter 342 to the output data port 320(M) for output (block 622).

Figure 7:
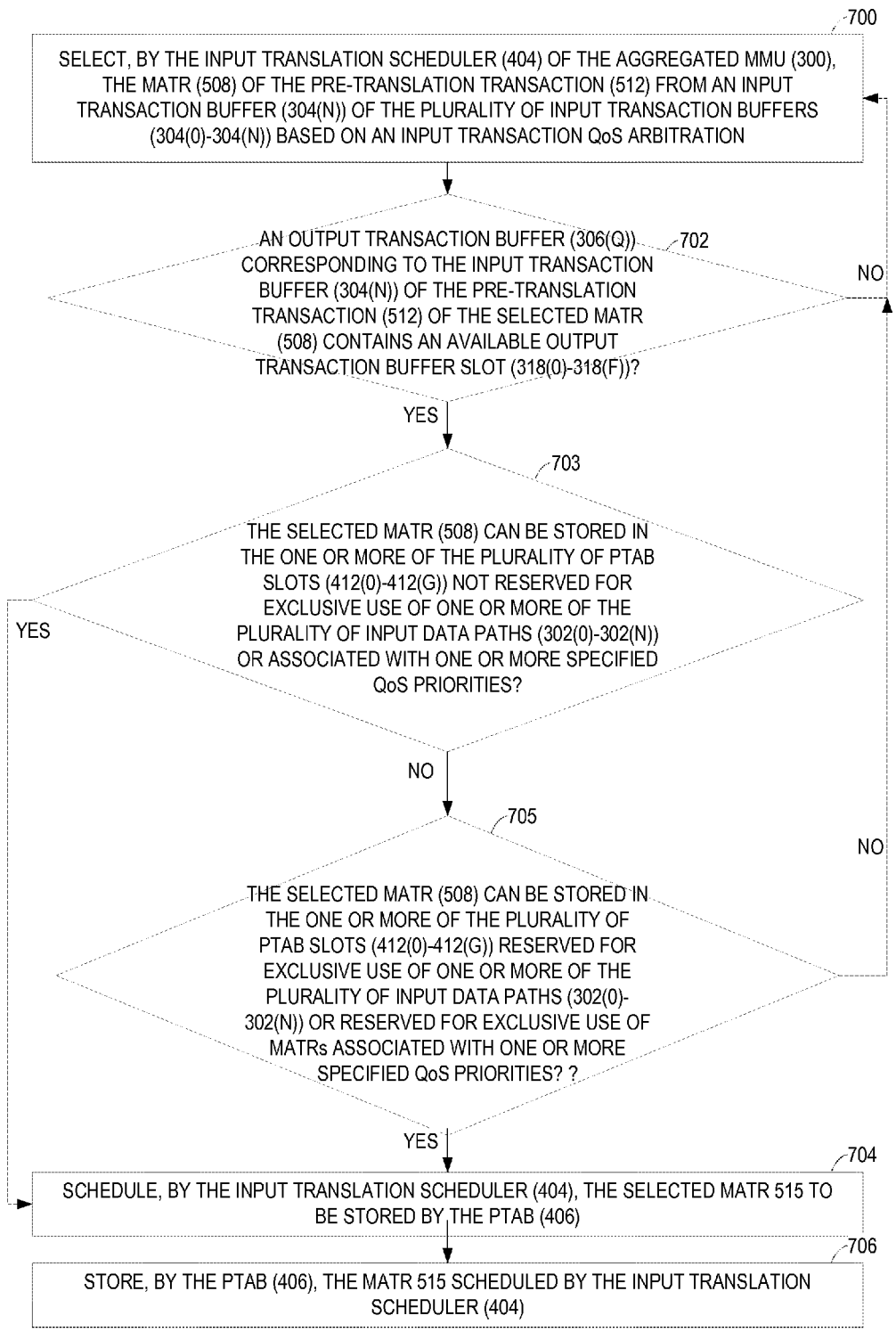
FIG. 7 is a flowchart illustrating exemplary operations of an input translation scheduler and a pending transaction address buffer (PTAB) of FIG. 4 for processing MATRs.

As noted above, in some aspects of the aggregated MMU 300, the operations of block 600 of FIG. 6A for retrieving the MATR 508 from the input transaction buffer 304(N) may be carried out by the input translation scheduler 404. In this regard, FIG. 7 illustrates exemplary operations of the input translation scheduler 404 and the PTAB 406 for processing the MATR 508. Elements of FIGS. 4 and 5A-5F are referenced in describing FIG. 7 for the sake of clarity. In FIG. 7, operations begin with the input translation scheduler 404 selecting the MATR 508 of the pre-translation transaction 512 from an input transaction buffer 304(N) of the plurality of input transaction buffers 304(0)-304(N) based on an input transaction QoS arbitration (block 700). In some aspects, the input translation scheduler 404 may determine whether the output transaction buffer 306(Q) corresponding to the input transaction buffer 304(N) of the pre-translation transaction 512 of the selected MATR 508 contains an available output transaction buffer slot 318(0)-318(F) (block 702). If no available output transaction buffer slot 318(0)-318(F) is available, processing may return to block 700.

However, if the input translation scheduler 404 determines at block 702 that an available output transaction buffer slot 318(0)-318(F) is available, the input translation scheduler 404 in some aspects may determine whether the selected MATR 508 can be stored in the one or more of the plurality of PTAB slots 412(0)-412(G) not reserved for exclusive use of one or more of the plurality of input data paths 302(0)-302(N) or associated with one or more specified QoS priorities (block 703). If so, processing resumes at block 704. If it is determined at decision block 703 that the selected MATR 508 cannot be stored in the one or more of the plurality of PTAB slots 412(0)-412(G) not reserved for exclusive use of one or more of the plurality of input data paths 302(0)-302(N) or associated with one or more specified QoS priorities, the input translation scheduler 404 in some aspects may next determine whether the selected MATR 508 can be stored in the one or more of the plurality of PTAB slots 412(0)-412(G) reserved for exclusive use of one or more of the plurality of input data paths 302(0)-302(N) or reserved for exclusive use of MATRs associated with one or more specified QoS priorities (block 705). If not, processing returns to block 700. Otherwise, the input translation scheduler 404 schedules the selected MATR 508 to be stored by the PTAB 406 (block 704). The PTAB 406 then stores the selected MATR 508 scheduled by the input translation scheduler 404 (block 706).

Figure 8:
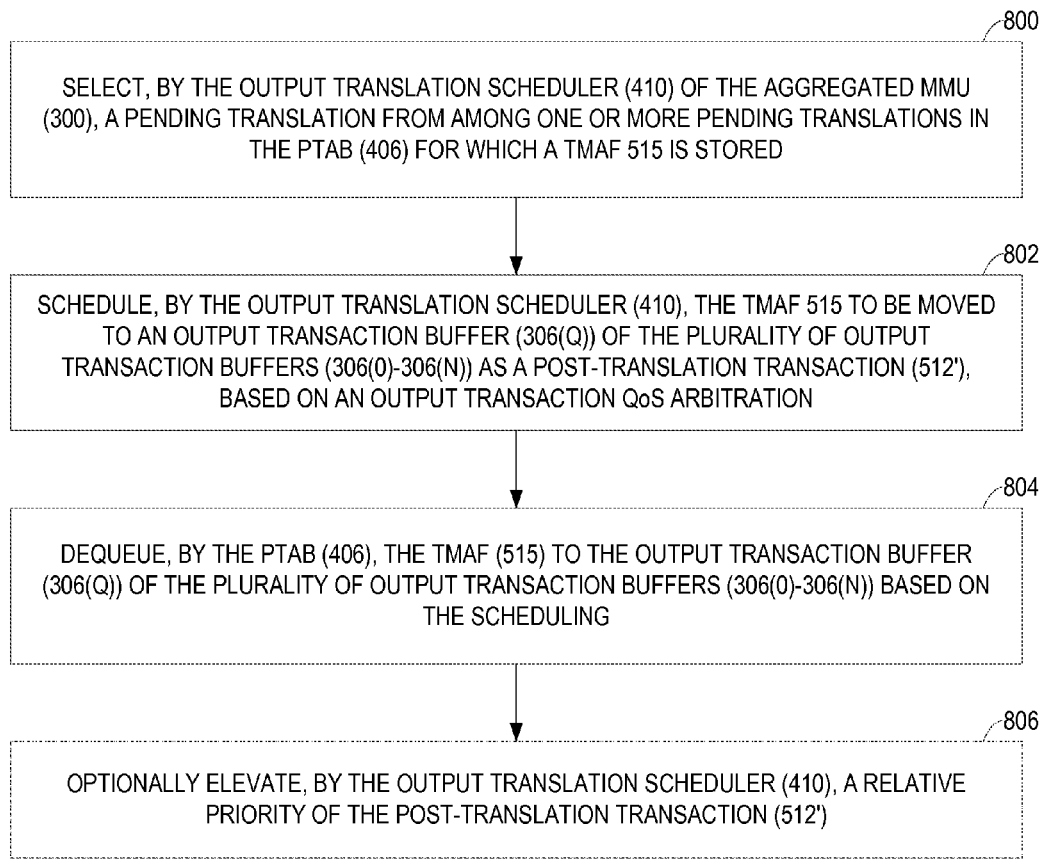
FIG. 8 is a flowchart illustrating exemplary operations of an output translation scheduler and a PTAB of FIG. 4 for completing processing of pending transactions.

FIG. 8 illustrates exemplary operations of the output translation scheduler 410, which in some aspects may carry out the operations of block 614 of FIG. 6B for providing the TMAF 515 to the output transaction buffer 306(Q). For the sake of clarity, elements of FIGS. 4 and 5A-5F are referenced in describing FIG. 8. Operations in FIG. 8 begin with the output translation scheduler 410 of the aggregated MMU 300 selecting a pending translation from among the one or more pending translations in the PTAB 406 for which the TMAF 515 is stored (block 800). The output translation scheduler 410 next schedules the TMAF 515 to be moved to the output transaction buffer 306(Q) of the plurality of output transaction buffers 306(0)-306(Q) as the post-translation transaction 512', based on the output transaction QoS arbitration (block 802). According to some aspects, the output transaction QoS arbitration may take into account the availability of the output transaction buffer slots 318(0)-318(F) and a relative priority of the pending TMAF 515, as non-limiting examples.

The PTAB 406 then dequeues the pending TMAF 515 to the output transaction buffer 306(Q) of the plurality of output transaction buffers 306(0)-306(Q) based on the scheduling (block 804). In some aspects, the output translation scheduler 410 may elevate a relative priority of the post-translation transaction 512' (block 806). This may be desirable in circumstances in which there exist new input transactions in the input transaction buffer 304(N) having a higher priority than the post-translation transaction 512' in the output transaction buffer 306(Q).

Figure 9A:
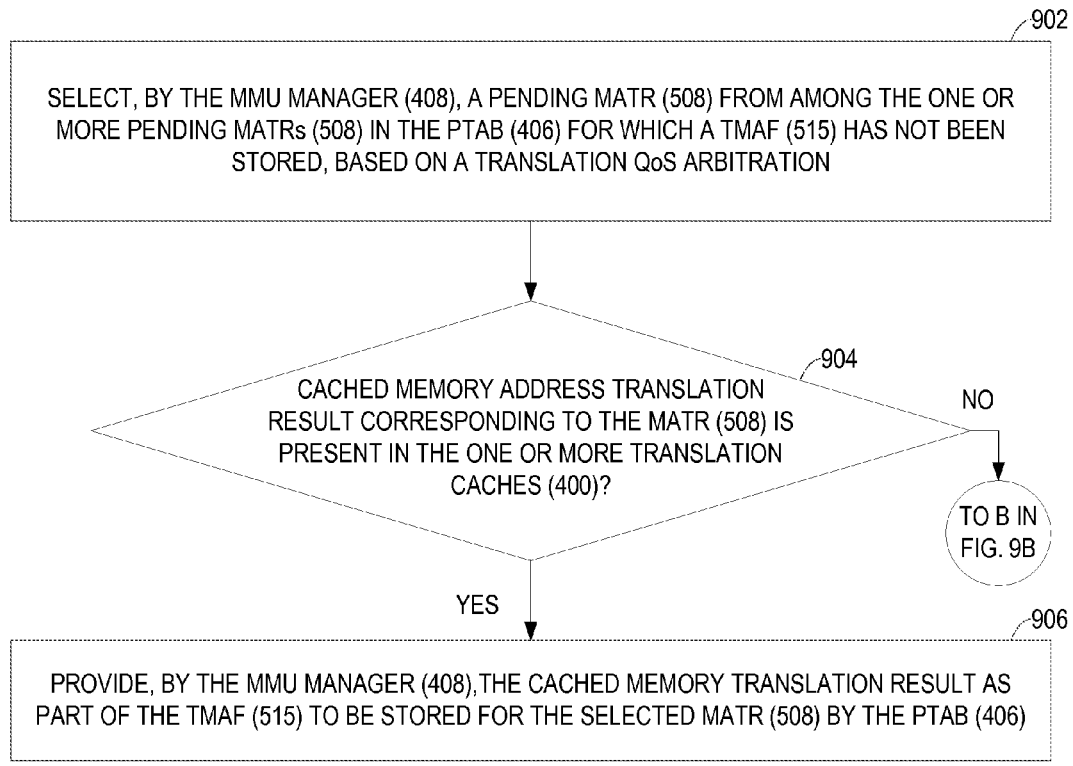
FIGS. 9A and 9B are flowcharts illustrating exemplary operations of an MMU manager of FIG. 4 for employing one or more translation caches and/or one or more hardware page table walkers of FIG. 4 to provide memory address translations for pending transactions.
Figure 9B:
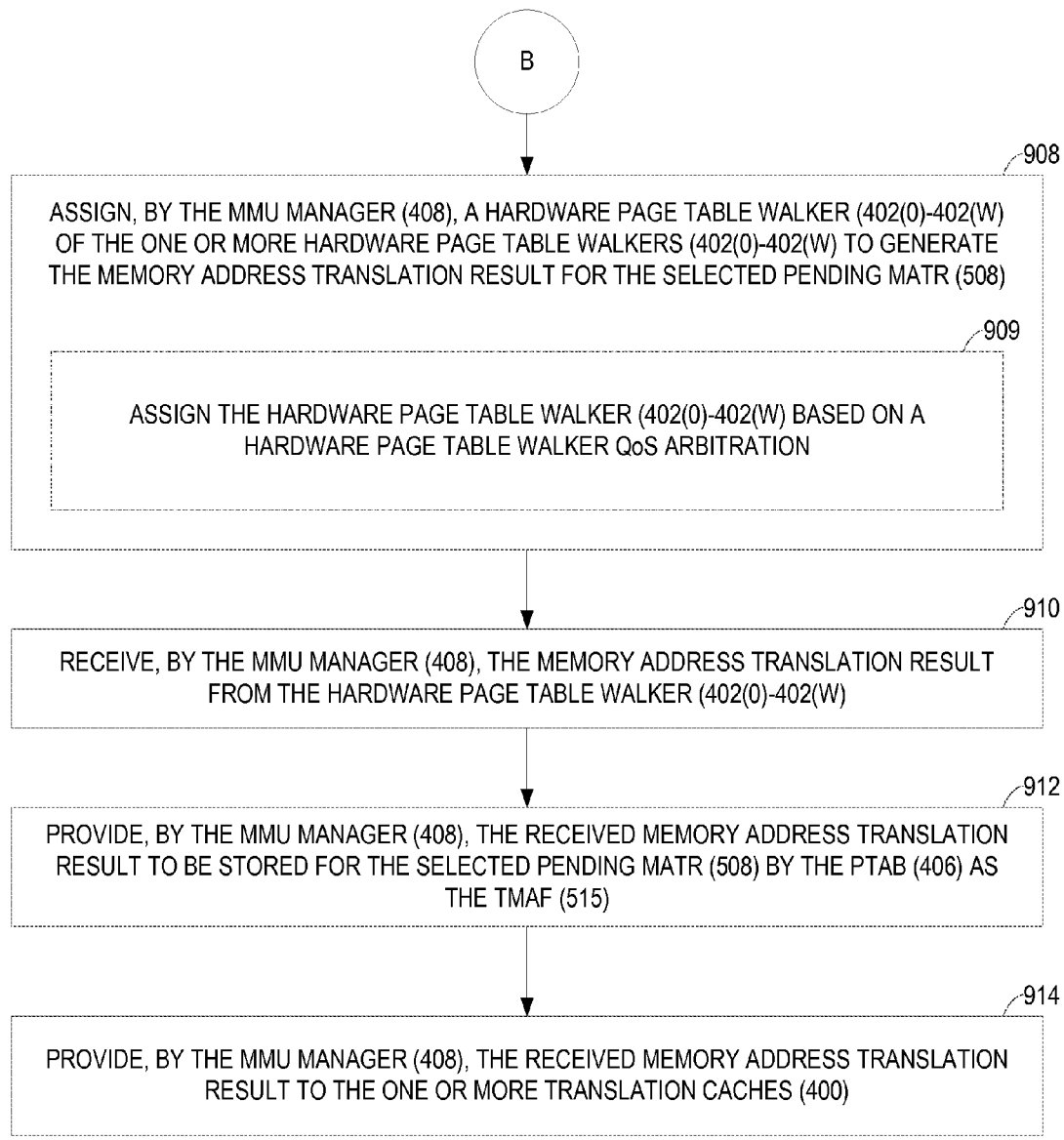

As described above with respect to FIG. 6A, the operations of block 604 for performing the memory address translation operation based on the MATR 508 may be carried out by the MMU manager 408 in some aspects of the aggregated MMU 300. In this regard, FIGS. 9A and 9B are provided to illustrate exemplary operations of the MMU manager 408 for performing the memory address translation operation. Elements of FIGS. 4 and 5A-5F are referenced in describing FIGS. 9A and 9B for the sake of clarity.

In FIG. 9A, the operations begin with the MMU manager 408 selecting a pending MATR 508 from among the one or more pending MATRs 508 in the PTAB 406 for which a TMAF 515 has not been stored, based on the translation QoS arbitration (block 902). The MMU manager 408 then determines whether a cached memory address translation result corresponding to the MATR 508 is present in the one or more translation caches 400(0)-400(P) (block 904). If so, the MMU manager 408 provides the cached memory translation result (e.g., a cached physical address) as part of the TMAF 515 to be stored for the selected MATR 508 by the PTAB 406 (block 906).

However, if the MMU manager 408 determines at decision block 904 that the translation cache 400 does not contain the address translation for the virtual address within the MATR 508, processing resumes at block 908 of FIG. 9B. Referring now to FIG. 9B, the MMU manager 408 assigns a hardware page table walker 402(0)-402(W) of the one or more hardware page table walkers 402(0)-402(W) to generate the memory address translation result (e.g., a physical memory address translation) for the selected pending MATR 508 (block 908). In some aspects, the operation of block 908 for assigning the hardware page table walker 402 is based on the hardware page table walker QoS arbitration (block 909). Upon completion of the memory translation, the MMU manager 408 receives the memory address translation result from the hardware page table walker 402(0)-402(W (block 910). The MMU manager 408 then provides the received memory address translation result to be stored for the selected pending MATR 508 by the PTAB 406 as the TMAF 515 (block 912). The MMU manager 408 further provides the received memory address translation result to the one or more translation caches 400.

Providing memory management functionality using aggregated MMUs, according to aspects disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 10:
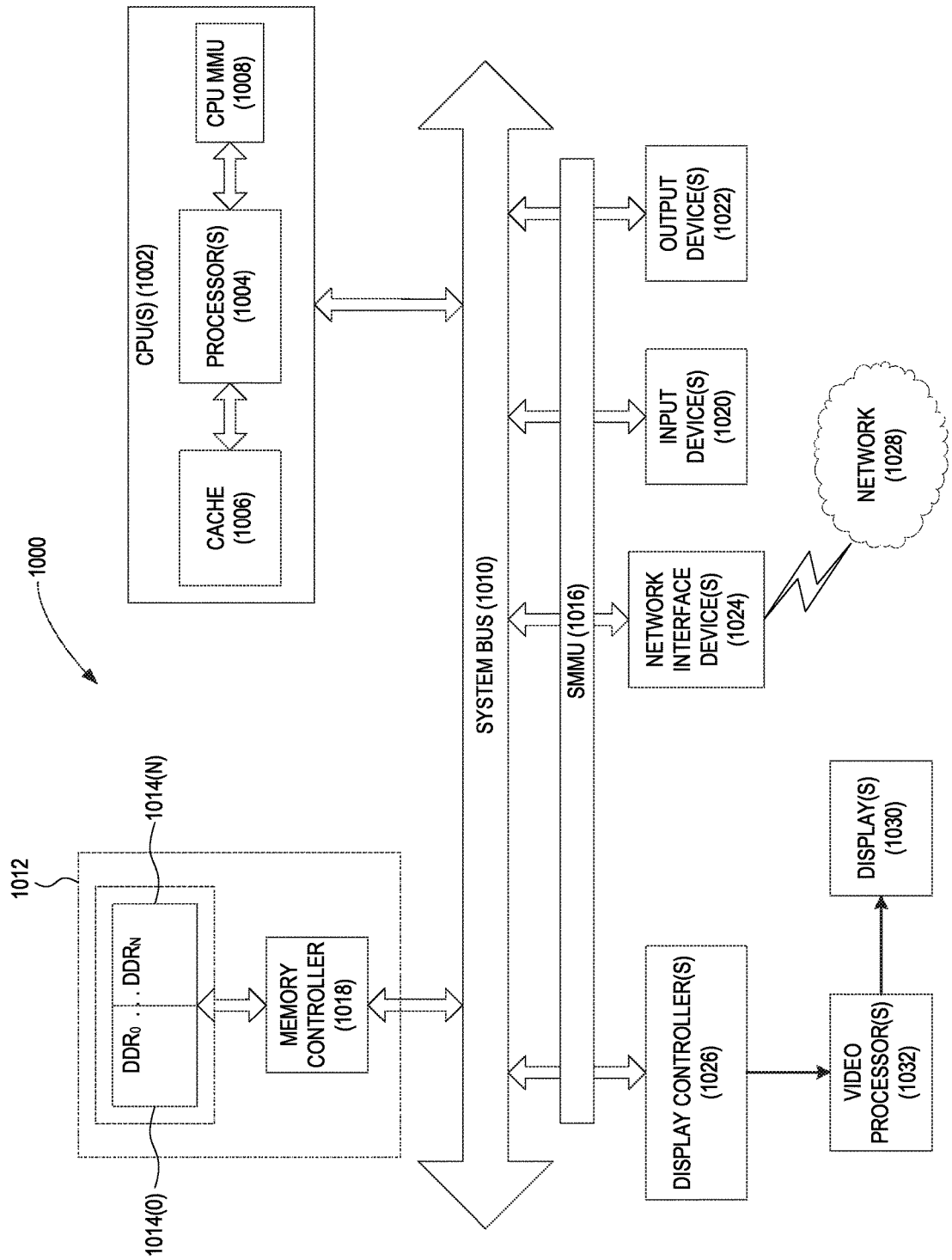
FIG. 10 is a block diagram of an exemplary processor-based system that can include the aggregated MMU of FIGS. 3A-3C.

In this regard, FIG. 10 illustrates an example of a processor-based system 1000 that may employ the exemplary aggregated MMU 300 illustrated in FIG. 3A. In this example, the processor-based system 1000 includes one or more central processing units (CPUs) 1002, each including one or more processors 1004. The CPU(s) 1002 may have cache memory 1006 coupled to the processor(s) 1004 for rapid access to temporarily stored data. The CPU(s) 1002 further includes a CPU MMU 1008 for providing address translation services for CPU memory access requests. The CPU(s) 1002 is coupled to a system bus 1010 and can intercouple master and slave devices included in the processor-based system 1000. As is well known, the CPU(s) 1002 communicates with these other devices by exchanging address, control, and data information over the system bus 1010. For example, the CPU(s) 1002 can communicate bus transaction requests to a memory system 1012, which provides memory units 1014(0)-1014(N). In the example of FIG. 10, a system MMU (SMMU) 1016 is also coupled to the system bus 1010. It is to be understood that either or both of the CPU MMU 1008 and the SMMU 1016 may comprise the aggregated MMU 300 of FIG. 3A.

Other master and slave devices can be connected to the system bus 1010 via the SMMU 1016. As illustrated in FIG. 10, these devices can include a memory controller 1018, one or more input devices 1020, one or more output devices 1022, one or more network interface devices 1024, and one or more display controllers 1026, as examples. The input device(s) 1020 can include any type of input device, including but not limited to input keys, switches, voice processors, etc. The output device(s) 1022 can include any type of output device, including but not limited to audio, video, other visual indicators, etc. The network interface device(s) 1024 can be any devices configured to allow exchange of data to and from a network 1028. The network 1028 can be any type of network, including but not limited to a wired or wireless network, a private or public network, a local area network (LAN), a wide local area network (WLAN), and the Internet. The network interface device(s) 1024 can be configured to support any type of communications protocol desired.

The CPU(s) 1002 may also be configured to access the display controller(s) 1026 over the system bus 1010 to control information sent to one or more displays 1030. The display controller(s) 1026 sends information to the display(s) 1030 to be displayed via one or more video processors 1032, which process the information to be displayed into a format suitable for the display(s) 1030. The display(s) 1030 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An aggregated memory management unit (MMU), comprising:
  a plurality of input data ports each configured to convey pre-translation transactions to a plurality of input data paths configured to receive a plurality of memory address pre-translation read transactions and a plurality of memory address pre-translation write transactions, the plurality of input data paths comprising a corresponding plurality of dedicated input transaction buffers each comprising a plurality of input transaction buffer slots configured to store a respective pre-translation transaction among the plurality of pre-translation transactions;

a plurality of output data paths comprising a corresponding plurality of dedicated output transaction buffers each comprising a plurality of output transaction buffer slots configured to store a respective post-translation transaction of a plurality of post-translation transactions;

a plurality of output data ports corresponding to the plurality of output data paths;

a post-translation arbiter; and an MMU management circuit configured to:
    retrieve a memory address translation request (MATR) of a pre-translation transaction from a dedicated input transaction buffer of the plurality of dedicated input transaction buffers;
    perform a memory address translation operation based on the MATR to generate a translated memory address field (TMAF); and
    provide the TMAF and a pre-translation transaction payload as a post-translation transaction to a dedicated output transaction buffer of the plurality of dedicated output transaction buffers;

wherein:
    each output data path of the plurality of output data paths is configured to output the post-translation transaction through the corresponding plurality of output data ports; and
    the post-translation arbiter is configured to:
        receive one or more post-translation transactions from a plural subset of the plurality of output data paths to be output to an output data port of the plurality of output data ports;
        select a post-translation transaction of the one or more post-translation transactions based on a post-translation Quality-of-Service (QoS) arbitration; and
        provide the TMAF of the selected post-translation transaction to the output data port for output.

2. The aggregated MMU of claim 1, configured to independently clock each of the plurality of input data paths.

3. The aggregated MMU of claim 1, wherein the MMU management circuit further comprises one or more of shared registers and shared control logic proximal to the plurality of input data paths and the plurality of output data paths to provide memory management functionality to the plurality of input data paths and the plurality of output data paths.

4. The aggregated MMU of claim 1, wherein an output data path of the plurality of output data paths is configured to reserve one or more output transaction buffer slots of the plurality of output transaction buffer slots for exclusive use of one or more input data paths of the plurality of input data paths while allowing access to a remainder of the plurality of output transaction buffer slots by all of the plurality of input data paths.

5. The aggregated MMU of claim 1, wherein an output data path of the plurality of output data paths is configured to reserve one or more output transaction buffer slots of the plurality of output transaction buffer slots for exclusive use of MATRs associated with one or more specified QoS priorities while allowing access to a remainder of the plurality of output transaction buffer slots by MATRs associated with any QoS priority.

6. The aggregated MMU of claim 1, wherein:
    the MMU management circuit comprises:
        one or more translation caches proximal to the plurality of input data paths and the plurality of output data paths and configured to cache a plurality of memory address translations of virtual addresses to physical addresses; and
        one or more hardware page table walkers proximal to the plurality of input data paths and the plurality of output data paths, each configured to generate a TMAF for a MATR; and
    the MMU management circuit is configured to perform the memory address translation operation based on the MATR to generate the TMAF using one or more of the one or more translation caches and one or more of the one or more hardware page table walkers.

7. The aggregated MMU of claim 6, wherein the one or more hardware page table walkers are each configured to generate the TMAF for the MATR using an output data port of the plurality of output data ports.

8. The aggregated MMU of claim 6, wherein the one or more hardware page table walkers are configured to generate the TMAF for the MATR using a dedicated output port.

9. The aggregated MMU of claim 6, wherein the MMU management circuit further comprises a pending transaction address buffer (PTAB) comprising a plurality of PTAB slots for storage of MATRs and corresponding TMAFs;
    the PTAB configured to:
        store the MATR of the pre-translation transaction retrieved from the dedicated input transaction buffer of the plurality of dedicated input transaction buffers by the MMU management circuit as a pending translation;
        receive the TMAF corresponding to the pending translation generated by the MMU management circuit;
        store the TMAF for the pending translation; and
        dequeue the pending translation to provide the TMAF to the dedicated output transaction buffer of the plurality of dedicated output transaction buffers.

10. The aggregated MMU of claim 9, wherein the PTAB is configured to reserve one or more PTAB slots of the plurality of PTAB slots for exclusive use of one or more input data paths of the plurality of input data paths while allowing access to a remainder of the plurality of PTAB slots by all of the plurality of input data paths.

11. The aggregated MMU of claim 9, wherein the PTAB is configured to reserve one or more PTAB slots of the plurality of PTAB slots for exclusive use of MATRs associated with one or more specified QoS priorities while allowing access to a remainder of the plurality of PTAB slots by MATRs associated with any QoS priority.

12. The aggregated MMU of claim 9, wherein the MMU management circuit further comprises an input translation scheduler configured to retrieve the MATR of the pre-translation transaction from the dedicated input transaction buffer of the plurality of dedicated input transaction buffers by being configured to:
    select the MATR of the pre-translation transaction from the dedicated input transaction buffer of the plurality of dedicated input transaction buffers based on an input transaction QoS arbitration; and
    schedule the selected MATR to be stored by the PTAB;

wherein the PTAB is configured to store the MATR by storing the selected MATR scheduled by the input translation scheduler.

13. The aggregated MMU of claim 12, wherein the input translation scheduler is configured to schedule the selected MATR to be stored by the PTAB by determining that the dedicated output transaction buffer corresponding to the dedicated input transaction buffer of the pre-translation transaction of the selected MATR contains an available output transaction buffer slot.

14. The aggregated MMU of claim 12, wherein the input translation scheduler is configured to schedule the selected MATR to be stored by the PTAB responsive to determining that the selected MATR can be stored in one or more of the plurality of PTAB slots reserved for exclusive use of one or more of the plurality of input data paths.

15. The aggregated MMU of claim 12, wherein the input translation scheduler is configured to schedule the selected MATR to be stored by the PTAB responsive to determining that the selected MATR can be stored in one or more of the plurality of PTAB slots reserved for exclusive use of MATRs associated with one or more specified QoS priorities.

16. The aggregated MMU of claim 9, wherein the MMU management circuit further comprises an output translation scheduler configured to provide the TMAF and the pre-translation transaction payload as the post-translation transaction to the dedicated output transaction buffer of the plurality of dedicated output transaction buffers by being configured to:
    select a pending translation from among one or more pending translations in the PTAB for which a TMAF is stored; and
    schedule the TMAF to be moved to a dedicated output transaction buffer of the plurality of dedicated output transaction buffers as a post-translation transaction, based on an output transaction QoS arbitration;
    wherein the PTAB is configured to dequeue the pending translation to provide the TMAF to the dedicated output transaction buffer of the plurality of dedicated output transaction buffers based on the scheduling.

17. The aggregated MMU of claim 16, wherein the output translation scheduler is configured to schedule the TMAF to be moved to the dedicated output transaction buffer of the plurality of dedicated output transaction buffers based on a determination that the dedicated output transaction buffer corresponding to the dedicated input transaction buffer from which the MATR of the pending translation was received contains an available output transaction buffer slot, and a relative priority of the pending transaction.

18. The aggregated MMU of claim 16, wherein the output translation scheduler is further configured to elevate a relative priority of the post-translation transaction.

19. The aggregated MMU of claim 9, wherein the MMU management circuit further comprises an MMU manager configured to perform the memory address translation operation based on the MATR by being configured to:
    select a pending MATR in the PTAB, from among one or more pending MATRs for which a TMAF has not been stored, based on a QoS arbitration between the one or more pending MATRs;
    determine whether a cached memory address translation result corresponding to the selected MATR is present in the one or more translation caches;
    responsive to determining that the cached memory address translation result is present in the one or more translation caches, provide the cached memory address translation result as part of the TMAF to be stored for the selected MATR by the PTAB; and
    responsive to determining that the cached memory address translation result is not present in the one or more translation caches:
        assign a hardware page table walker of the one or more hardware page table walkers to generate a memory address translation result for the selected pending MATR;
        receive the memory address translation result from the hardware page table walker;
        provide the received memory address translation result to be stored for the selected pending MATR by the PTAB as a TMAF; and
        provide the received memory address translation result to the one or more translation caches.

20. The aggregated MMU of claim 19, wherein the MMU manager is configured to assign the hardware page table walker of the one or more hardware page table walkers to generate the memory address translation result for the selected pending MATR based on a hardware page table walker QoS arbitration.

21. The aggregated MMU of claim 1 integrated into an integrated circuit (IC).

22. The aggregated MMU of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

23. An aggregated memory management unit (MMU), comprising:
    a means for retrieving a memory address translation request (MATR) from a dedicated input transaction buffer of a plurality of dedicated input transaction buffers corresponding to a plurality of input data paths of the aggregated MMU;
    a means for performing a memory address translation operation based on the MATR to generate a translated memory address field (TMAF);
    a means for providing the TMAF and a pre-translation transaction payload as a post-translation transaction to a dedicated output transaction buffer of a plurality of dedicated output transaction buffers corresponding to the plurality of input data paths;
    a means for outputting the post-translation transaction via an output data path of a plurality of output data paths to an output data port of a plurality of output data ports of the aggregated MMU;
    a means for receiving one or more post-translation transactions from a plural subset of the plurality of output data paths to be output to an output data port of the plurality of output data ports;
    a means for selecting a post-translation transaction of the one or more post-translation transactions based on a post-translation Quality-of-Service (QoS) arbitration; and
    a means for providing the TMAF of the selected post-translation transaction to the output data port for output.

24. The aggregated MMU of claim 23, wherein the means for performing the memory address translation operation based on the MATR to generate the TMAF comprises one or more translation caches proximal to the plurality of input data paths and the plurality of output data paths and one or more hardware page table walkers proximal to the plurality of input data paths and the plurality of output data paths.

25. A method for providing memory management, comprising:
retrieving, by an aggregated memory management unit (MMU), a memory address translation request (MATR) of a pre-translation transaction from a dedicated input transaction buffer of a plurality of dedicated input transaction buffers corresponding to a plurality of input data paths of the aggregated MMU;
performing a memory address translation operation based on the MATR to generate a translated memory address field (TMAF);
providing the TMAF and a pre-translation transaction payload as a post-translation transaction to a dedicated output transaction buffer of a plurality of dedicated output transaction buffers corresponding to the plurality of input data paths;
outputting the post-translation transaction via an output data path of a plurality of output data paths to an output data port of a plurality of output data ports of the aggregated MMU;
receiving, by a post-translation arbiter of the aggregated MMU, one or more post-translation transactions from a plural subset of the plurality of output data paths to be output to an output data port of the plurality of output data ports;
selecting, by the post-translation arbiter, a post-translation transaction of the one or more post-translation transactions based on a post-translation Quality-of-Service (QoS) arbitration; and
providing, by the post-translation arbiter, the selected post-translation transaction to the output data port for output.

26. The method of claim 25, wherein each of the plurality of input data paths is independently clocked.

27. The method of claim 25, wherein the aggregated MMU comprises one or more of shared registers and shared control logic proximal to the plurality of input data paths and the plurality of output data paths to provide memory management functionality to the plurality of input data paths and the plurality of output data paths.

28. The method of claim 25, wherein an output data path of the plurality of output data paths is configured to reserve one or more output transaction buffer slots of a plurality of output transaction buffer slots for exclusive use of one or more input data paths of the plurality of input data paths while allowing access to a remainder of the plurality of output transaction buffer slots by all of the plurality of input data paths.

29. The method of claim 25, wherein an output data path of the plurality of output data paths is configured to reserve one or more output transaction buffer slots of a plurality of output transaction buffer slots for exclusive use of MATRs associated with one or more specified QoS priorities while allowing access to a remainder of the plurality of output transaction buffer slots by MATRs associated with any QoS priority.

30. The method of claim 25, wherein performing the memory address translation operation based on the MATR to generate the TMAF comprises performing the memory address translation operation using one or more translation caches proximal to the plurality of input data paths and the plurality of output data paths and one or more hardware page table walkers proximal to the plurality of input data paths and the plurality of output data paths.

31. The method of claim 30, wherein the one or more hardware page table walkers generate the TMAF for the MATR using an output data port of the plurality of output data ports.

32. The method of claim 30, wherein the one or more hardware page table walkers generate the TMAF for the MATR using a dedicated output port.

33. The method of claim 30, further comprising:
storing, by a pending transaction address buffer (PTAB) of the aggregated MMU, the MATR of the pre-translation transaction retrieved from the dedicated input transaction buffer of the plurality of dedicated input transaction buffers by an MMU as a pending translation;
receiving, by the PTAB, the TMAF corresponding to the pending translation generated by an MMU management circuit;
storing, by the PTAB, the TMAF for the pending translation; and
dequeuing, by the PTAB, the pending translation to provide the TMAF to the dedicated output transaction buffer of the plurality of dedicated output transaction buffers.

34. The method of claim 33, wherein one or more PTAB slots of a plurality of PTAB slots of the PTAB is reserved for exclusive use of one or more input data paths of the plurality of input data paths while a remainder of the plurality of PTAB slots is accessible by all of the plurality of input data paths.

35. The method of claim 33, wherein one or more PTAB slots of a plurality of PTAB slots of the PTAB is reserved for exclusive use of MATRs associated with one or more specified QoS priorities while a remainder of the plurality of PTAB slots is accessible by MATRs associated with any QoS priority.

36. The method of claim 33, wherein retrieving the MATR of the pre-translation transaction from the dedicated input transaction buffer of the plurality of dedicated input transaction buffers comprises:
selecting, by an input translation scheduler of the aggregated MMU, the MATR of the pre-translation transaction from the dedicated input transaction buffer of the plurality of dedicated input transaction buffers based on an input transaction QoS arbitration; and
scheduling, by the input translation scheduler, the selected MATR to be stored by the PTAB;
wherein storing the MATR comprises storing the selected MATR scheduled by the input translation scheduler.

37. The method of claim 36, wherein scheduling the selected MATR to be stored by the PTAB comprises determining that the dedicated output transaction buffer corresponding to the dedicated input transaction buffer of the pre-translation transaction of the selected MATR contains an available output transaction buffer slot.

38. The method of claim 36, wherein scheduling the selected MATR to be stored by the PTAB comprises determining that the selected MATR can be stored in the one or more of the plurality of PTAB slots reserved for exclusive use of one or more of the plurality of input data paths.

39. The method of claim 36, wherein scheduling the selected MATR to be stored by the PTAB comprises determining that the selected MATR can be stored in the one or more of the plurality of PTAB slots reserved for exclusive use of MATRs associated with one or more specified QoS priorities.

40. The method of claim 33, wherein providing the TMAF and the pre-translation transaction payload as the post-translation transaction to the dedicated output transaction buffer of the plurality of dedicated output transaction buffers comprises:
- selecting, by an output translation scheduler of the aggregated MMU, a pending translation from among one or more pending translations in the PTAB for which a TMAF is stored; and
- scheduling, by the output translation scheduler, the TMAF to be moved to a dedicated output transaction buffer of the plurality of dedicated output transaction buffers as a post-translation transaction, based on an output transaction QoS arbitration;
- wherein dequeuing the pending TMAF to provide the TMAF to the dedicated output transaction buffer of the plurality of dedicated output transaction buffers is based on the scheduling.

41. The method of claim 40, wherein scheduling the pending TMAF to be moved to the dedicated output transaction buffer of the plurality of dedicated output transaction buffers is based on a determination that the dedicated output transaction buffer corresponding to the dedicated input transaction buffer from which the MATR of the pending translation was received contains an available output transaction buffer slot, and a relative priority of the pending translation.

42. The method of claim 40, further comprising elevating, by the output translation scheduler, a relative priority of the post-translation transaction.

43. The method of claim 33, wherein performing the memory address translation operation based on the MATR comprises:
- selecting, by an MMU manager of the aggregated MMU, a pending MATR in the PTAB, from among one or more pending MATRs for which a TMAF has not been stored, based on a QoS arbitration between the one or more pending MATRs;
- determining, by the MMU manager, whether a cached memory address translation result corresponding to the selected pending MATR is present in the one or more translation caches;
- responsive to determining that the cached memory address translation result is present in the one or more translation caches, providing, by the MMU manager, the cached memory address translation result as part of the TMAF to be stored for the selected pending MATR by the PTAB; and
- responsive to determining that the cached memory address translation result is not present in the one or more translation caches:
  - assigning, by the MMU manager, a hardware page table walker of the one or more hardware page table walkers to generate a memory address translation result for the MATR of the selected pending MATR;
  - receiving, by the MMU manager, the memory address translation result from the hardware page table walker; and
  - providing, by the MMU manager, the received memory address translation result to be stored for the selected pending MATR by the PTAB as a TMAF; and
  - providing the received memory address translation result to the one or more translation caches.

44. The method of claim 43, wherein assigning the hardware page table walker of the one or more hardware page table walkers to generate the memory address translation result for the selected MATR is based on a hardware page table walker QoS arbitration.

\* \* \* \* \*